(12) United States Patent
Woolf et al.

(10) Patent No.: US 11,629,908 B2
(45) Date of Patent: *Apr. 18, 2023

(54) THERMAL CONTROL SYSTEM

(71) Applicant: Lineage Logistics, LLC, Irvine, CA (US)

(72) Inventors: Alexander James Woolf, San Francisco, CA (US); Elliott Gerard Wolf, San Francisco, CA (US); Daniel Thomas Wintz, San Francisco, CA (US); Jesse Scott Tootell, San Francisco, CA (US); Bryan Thomas Kaye, Santa Barbara, CA (US); Jesse Dylan Crossno, Santa Barbara, CA (US); Alexander Ming Zhang, Daly City, CA (US); Gabriel Len West, Eatonton, GA (US); John Richardson Crawford, Raleigh, NC (US); Tiara Lee Flewelling, Northville, MI (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,829

(22) Filed: Nov. 22, 2021

(65) Prior Publication Data

US 2022/0155006 A1 May 19, 2022

Related U.S. Application Data

(63) Continuation of application No. 16/413,309, filed on May 15, 2019, now Pat. No. 11,181,316, which is a
(Continued)

(51) Int. Cl.
*F25D 29/00* (2006.01)
*F25D 13/00* (2006.01)
*G05B 13/04* (2006.01)

(52) U.S. Cl.
CPC ............. *F25D 29/00* (2013.01); *F25D 13/00* (2013.01); *G05B 13/042* (2013.01);
(Continued)

(58) Field of Classification Search
None
See application file for complete search history.

(56) References Cited

U.S. PATENT DOCUMENTS 4,807,443 A 2/1989 Battson et al.
7,905,103 B2 3/2011 Larsen et al.
(Continued)

FOREIGN PATENT DOCUMENTS

CN 101694590 1/2010
CN 102597409 7/2012
(Continued)

OTHER PUBLICATIONS

International Search Report & Written Opinion in International Application PCT/US2019/034746 dated Sep. 23, 2019, 16 pages.

*Primary Examiner* — Paul B Yanchus, III
(74) *Attorney, Agent, or Firm* — Barnes & Thornburg LLP

(57) ABSTRACT

The subject matter of this specification can be embodied in, among other things, a method for time shifting when a cold storage facility is cooled that includes determining a thermal model of a cold storage facility, obtaining an energy cost model that describes a schedule of variable energy costs over a predetermined period of time in the future, determining an operational schedule for at least a portion of a refrigeration system based on the thermal model, the energy cost model, and a maximum allowed temperature, and powering on the portion the refrigeration system based on the operational schedule, cooling, by the powered portion of the refrigeration system to a temperature below the maximum allowed
(Continued)

temperature, reducing power usage of the powered portion of the refrigeration system based on the operational schedule, and permitting the facility to be warmed by ambient temperatures toward the maximum allowed temperature.

22 Claims, 11 Drawing Sheets

Related U.S. Application Data continuation of application No. 15/993,259, filed on May 30, 2018, now Pat. No. 10,323,878.

(52) U.S. Cl.
CPC ...... *F25B 2500/19* (2013.01); *F25D 2500/04* (2013.01); *F25D 2700/123* (2013.01)

(56) References Cited

U.S. PATENT DOCUMENTS

| | | | |
|---|---|---|---|
| 7,992,630 | B2 | 8/2011 | Springer et al. |
| 10,323,878 | B1 | 6/2019 | Woolf |
| 11,181,316 | B2 * | 11/2021 | Woolf .............. G05D 23/1917 |
| 2003/0177776 | A1 | 9/2003 | Ghent et al. |
| 2005/0132734 | A1 | 6/2005 | Narayanamurthy et al. |
| 2007/0125104 | A1 | 6/2007 | Ehlers |
| 2008/0071892 | A1 | 3/2008 | Muro et al. |
| 2012/0023987 | A1 | 2/2012 | Besore et al. |
| 2014/0041399 | A1 | 2/2014 | Gan et al. |
| 2015/0124390 | A1 | 5/2015 | Koch |
| 2015/0135737 | A1 | 5/2015 | Cresswell et al. |
| 2015/0295423 | A1 | 10/2015 | Murayanna |
| 2016/0147204 | A1 | 5/2016 | Wichmann et al. |
| 2017/0067661 | A1 | 3/2017 | Gonzalez et al. |
| 2017/0098181 | A1 | 4/2017 | Herman et al. |
| 2017/0206615 | A1 | 7/2017 | Sloop et al. |
| 2019/0014488 | A1 | 1/2019 | Tan et al. |

FOREIGN PATENT DOCUMENTS

| | | |
|---|---|---|
| CN | 107768775 | 3/2018 |
| EP | 3024107 | 2/2016 |
| JP | 2016173103 | 9/2016 |
| KR | 20150039023 | 4/2015 |
| KR | 20150145259 | 12/2015 |
| KR | 20170110097 | 10/2017 |
| WO | WO 2018005760 | 1/2018 |

* cited by examiner

THERMAL CONTROL SYSTEM

CROSS REFERENCE TO RELATED APPLICATIONS

This application is a continuation application of U.S. patent application Ser. No. 16/413,309, filed May 15, 2019, which is a continuation application of U.S. patent application Ser. No. 15/993,259, filed May 30, 2018, all of which are incorporated herein in their entirety.

TECHNICAL FIELD

This document generally relates to systems and techniques for refrigeration management.

BACKGROUND

Cold storage facilities are used to cool and/or maintain stored content (e.g., inventory, food) at a reduced temperature. Cold storage facilities range across a wide array of sizes, from small (e.g., walk-in coolers) to large (e.g., freezer warehouses). The temperature within a cold storage facility is a result of a balance between heat removal from and heat intrusion into the facility.

Heat intrusion within a cold storage facility can come from many different sources, such as the environment (e.g., ambient air temperature, solar radiation), the stored content (e.g., warm product to be chilled), heat-producing equipment operating inside the facility (e.g., lights, forklifts), body heat from people working inside the facility, and facility operations (e.g., opening of doors as people and inventory pass into and out of the facility).

The rate of heat intrusion can vary over time. Heat intrusion generally increases during the day as outdoor summer temperatures rise and as the sun rises to its peak midday intensity, and generally decreases as outdoor summer temperatures and solar intensity fall. Heat intrusion can also increase during times of high activity, such as during the workday when doors are opened frequently, and decrease during times of low activity such as during after-hours when doors generally remain shut.

Heat removal from a cold storage facility generally requires the consumption of power (e.g., electricity to drive refrigeration compressors). As heat intrusion varies, so too does the need for power to perform heat removal.

SUMMARY

This document generally describes systems and techniques for improved refrigeration management. For example, models of cold storage facilities, such as refrigerated warehouses, can be generated and used to determine the cooling strategies for more efficiently selecting times when and temperatures to which the cold storage facilities are cooled. Cold storage facilities can be modeled as thermal batteries that are capable of absorbing and storing thermal energy that can then be released over time to permit time shifting for when cooling occurs. For example, instead of cooling a cold storage facility as needed to maintain a temperature or power draw setpoint, cold storage facilities can be cooled to a lower temperature than the setpoint and then the cooling systems can be modulated to consume less energy or be turned off (not consume energy) as the cold storage facility gradually warms (expends the stored thermal energy). The timing around when and set point to which a facility is cooled can depend on a variety of factors, such as the thermal model for a facility, which can model thermal effect of different usage of the facility (e.g., effect of facility doors being opened/closed, effect of new items being added to the facility, effect of items begin removed from the facility), as well as external factors, such as the weather and solar load on the facility for a given day.

In a first aspect, a cold storage facility includes a cold storage enclosure defining an enclosed space, a refrigeration system configured to cool the enclosed space, a plurality of temperature sensors configured to sense temperature levels at a plurality of locations within the enclosed space, a control system including a data processing apparatus, a communication subsystem that transmits and receives data over one or more networks and one or more media, a memory device storing instructions that when executed by data processing apparatus cause the control system to perform operations including determining a thermal model of the enclosed space based on temperature levels sensed by the plurality of temperature sensors, obtaining an energy cost model that describes a schedule of variable energy costs over a predetermined period of time in the future, determining an operational schedule for at least a portion of the refrigeration system based on the thermal model, the energy cost model, and a maximum allowed temperature for the enclosed space, and powering on the portion the refrigeration system based on the operational schedule, cooling, by the powered portion of the refrigeration system, the enclosed space to a temperature below the maximum allowed temperature, reducing power usage of the powered portion of the refrigeration system based on the operational schedule, and permitting the enclosed space to be warmed by ambient temperatures toward the maximum allowed temperature.

Various embodiments can include some, all, or none of the following features. The operations can also include determining a measured temperature of the enclosed space, and powering on at least a portion of the refrigeration system based on the determined measured temperature and a predetermined threshold temperature value that is less than the maximum allowed temperature. The thermal model can be representative of at least one of a thermal capacity of content within the enclosed space, and a thermal resistance of the cold storage enclosure. Determining an operational schedule based on the thermal model, the energy cost model, and a maximum allowed temperature for the cold storage facility can include identifying, based on the energy cost model, a first period of time during which energy costs a first amount per unit, identifying, based on the energy cost model, a second period of time preceding the first period of time, during which energy costs a second amount per unit that is less than the first amount per unit, adding information descriptive of the second period of time to the operational schedule, the information being representative of time during which the refrigeration system is to be powered on to cool the enclosed space below the maximum allowed temperature, and adding information descriptive of the first period of time to the operational schedule, the information being representative of time during which the enclosed space is allowed to warm toward the maximum allowed temperature. Determining a thermal model of the enclosed space can include powering on the portion the refrigeration system based on the operational schedule, cooling, by the powered portion of the refrigeration system, the enclosed space to a temperature below the maximum allowed temperature, reducing power usage of the powered portion of the refrigeration system based on the operational schedule, determining a first plurality of temperature levels sensed by the plurality of temperature sensors, permitting the enclosed space to be warmed by ambient temperatures toward the maximum allowed temperature, determining a second plurality of temperature levels sensed by the plurality of temperature sensors, and determining a thermal capacity of content of the enclosed space. Determining a thermal model of the enclosed space can include powering on the portion the refrigeration system based on the operational schedule, cooling, by the powered portion of the refrigeration system, the enclosed space to a temperature below the maximum allowed temperature, reducing power usage of the powered portion of the refrigeration system based on the operational schedule, determining a first plurality of temperature levels sensed by the plurality of temperature sensors, permitting the enclosed space to be warmed by ambient temperatures toward the maximum allowed temperature, determining a second plurality of temperature levels sensed by the plurality of temperature sensors, and determining a thermal capacity of content of the enclosed space.

In a second aspect, a cold storage management computer system for shifting times when a cold storage facility is cooled includes a data processing apparatus, a communication subsystem that transmits and receives data over one or more networks and one or more media, and a memory device storing instructions that when executed by data processing apparatus cause the user device to perform operations including determining a thermal model of a cold storage facility comprising a cold storage enclosure configured to be cooled by a refrigeration system and defining an enclosed space, receiving, from a control system, a request for an operational schedule for at least a portion of the refrigeration system, obtaining an energy cost model that describes a schedule of variable energy costs over a predetermined period of time in the future, determining an operational schedule for at least a portion of the refrigeration system based on the thermal model, the energy cost model, and a maximum allowed temperature for the enclosed space, and providing, in response to the request, the operational schedule.

Various implementations can include some, all, or none of the following features. The operations can also include determining a measured temperature of the enclosed space, and powering on at least a portion of the refrigeration system based on the determined measured temperature and a predetermined threshold temperature value that is less than the maximum allowed temperature. The thermal model can be representative of at least one of the thermal capacity of content within the enclosed space, and the thermal resistance of the cold storage enclosure. Determining an operational schedule based on the thermal model, the energy cost model, and a maximum allowed temperature for the cold storage facility can include identifying, based on the energy cost model, a first period of time during which energy costs a first amount per unit, identifying, based on the energy cost model, a second period of time preceding the first period of time, during which energy costs a second amount per unit that is less than the first amount per unit, adding information descriptive of the second period of time to the operational schedule, the information being representative of time during which the refrigeration system is to be powered on to cool the enclosed space below the maximum allowed temperature, and adding information descriptive of the first period of time to the operational schedule, the information being representative of time during which the enclosed space is allowed to warm toward the maximum allowed temperature. Determining a thermal model of the enclosed space can include powering on the portion the refrigeration system based on the operational schedule, cooling, by the powered portion of the refrigeration system, the enclosed space to a temperature below the maximum allowed temperature, reducing power usage of the powered portion of the refrigeration system based on the operational schedule, determining a first plurality of temperature levels sensed by a plurality of temperature sensors, permitting the enclosed space to be warmed by ambient temperatures toward the maximum allowed temperature, determining a second plurality of temperature levels sensed by the plurality of temperature sensors, and determining a thermal capacity of content of the enclosed space.

In a third aspect, a cold storage control system for controlling cooling of a cold storage facility includes a data processing apparatus, a communication subsystem that transmits and receives data over one or more networks and one or more media, one or more input ports configured to receive sensor signals from a plurality of temperature sensors configured to sense temperature levels at a plurality of locations within a cold storage enclosure defining an enclosed space, one or more output ports configured to trigger operation of a refrigeration system configured to cool the enclosed space, a memory device storing instructions that when executed by data processing apparatus cause the cold storage control system to perform operations including transmitting, over the one or more networks, a request for an operational schedule for at least a portion of the refrigeration system, receiving, in response to the request, the operational schedule based on a thermal model, an energy cost model, and a maximum allowed temperature for the enclosed space, the operational schedule comprising information that is descriptive of a first period of time and a second period of time that proceeds the first period of time, powering on the portion the refrigeration system at a start time of the second period of time, cooling, by the powered portion of the refrigeration system, the enclosed space to a temperature below the maximum allowed temperature during the second period of time, reducing power usage of the powered portion of the refrigeration system at a start time of the first period of time, and permitting the enclosed space to be warmed by ambient temperatures toward the maximum allowed temperature during the first period of time.

Various embodiments can include some, all, or none of the following features. The cold storage control system can also include determining that at least a portion of the enclosed space has warmed to at least a predetermined threshold temperature value that is less than the maximum allowed temperature, overriding the operational schedule by powering on the portion the refrigeration system during the first period of time. The operations can also include determining a measured temperature of the enclosed space, and powering on at least a portion of the refrigeration system based on the determined measured temperature and a predetermined threshold temperature value that is less than the maximum allowed temperature. The thermal model can be representative of at least one of a thermal capacity of content within the enclosed space, and a thermal resistance of the cold storage enclosure. Determining an operational schedule can be based on the thermal model, the energy cost model, and a maximum allowed temperature for the cold storage facility can include identifying, based on the energy cost model, a first period of time during which energy costs a first amount per unit, identifying, based on the energy cost model, a second period time preceding the first period of time, during which energy costs a second amount per unit that is less than the first amount per unit, adding information descriptive of the second period of time to the operational schedule, the information being representative of time during which the refrigeration system is to be powered on to cool the enclosed space below the maximum allowed temperature, and adding information descriptive of the first period of time to the operational schedule, the information being representative of time during which the enclosed space is allowed to warm toward the maximum allowed temperature. Determining a thermal model of the enclosed space can include powering on the portion the refrigeration system based on the operational schedule, cooling, by the powered portion of the refrigeration system, the enclosed space to a temperature below the maximum allowed temperature, reducing power usage of the powered portion of the refrigeration system based on the operational schedule, determining a first plurality of temperature levels sensed by the plurality of temperature sensors, permitting the enclosed space to be warmed by ambient temperatures toward the maximum allowed temperature, determining a second plurality of temperature levels sensed by the plurality of temperature sensors, and determining a thermal capacity of content of the enclosed space.

In a fourth aspect, a method for time shifting when a cold storage facility is cooled includes determining a thermal model of a cold storage facility comprising a cold storage enclosure that is configured to be cooled by a refrigeration system and defining an enclosed space, obtaining an energy cost model that describes a schedule of variable energy costs over a predetermined period of time in the future, determining an operational schedule for at least a portion of the refrigeration system based on the thermal model, the energy cost model, and a maximum allowed temperature for the enclosed space, and powering on the portion the refrigeration system based on the operational schedule, cooling, by the powered portion of the refrigeration system, the enclosed space to a temperature below the maximum allowed temperature, reducing power usage of the powered portion of the refrigeration system based on the operational schedule, and permitting the enclosed space to be warmed by ambient temperatures toward the maximum allowed temperature.

Various implementations can include some, all, or none of the following features. The method can also include determining a measured temperature of the enclosed space, and powering on at least a portion of the refrigeration system based on the determined measured temperature and a predetermined threshold temperature value that is less than the maximum allowed temperature. The thermal model can be representative of at least one of a thermal capacity of content within the enclosed space, and a thermal resistance of the cold storage enclosure. Determining an operational schedule based on the thermal model, the energy cost model, and a maximum allowed temperature for the cold storage facility can include identifying, based on the energy cost model, a first period of time during which energy costs a first amount per unit, identifying, based on the energy cost model, a second period of time preceding the first period of time, during which energy costs a second amount per unit that is less than the first amount per unit, adding information descriptive of the second period of time to the operational schedule, the information being representative of time during which the refrigeration system is to be powered on to cool the enclosed space below the maximum allowed temperature, and adding information descriptive of the first period of time to the operational schedule, the information being representative of time during which the enclosed space is allowed to warm toward the maximum allowed temperature. Determining a thermal model of the enclosed space can include powering on the portion the refrigeration system based on the operational schedule, cooling, by the powered portion of the refrigeration system, the enclosed space to a temperature below the maximum allowed temperature, reducing power usage of the powered portion of the refrigeration system based on the operational schedule, determining a first plurality of temperature levels sensed by a plurality of temperature sensors, permitting the enclosed space to be warmed by ambient temperatures toward the maximum allowed temperature, determining a second plurality of temperature levels sensed by the plurality of temperature sensors, and determining a thermal capacity of content of the enclosed space.

The disclosed systems and techniques may provide any of a variety of advantages. Time-shifted cooling strategies can introduce a variety of efficiencies, which can be particularly relevant in the context of cooled or refrigerated facilities, which have traditionally consumed large amounts of energy. For example, facilities can reduce and/or eliminate instances of a cooling system (and/or some of its subcomponents) being toggled on and off, which can introduce inefficiencies as the system ramps up and down. With some conventional facilities, cooling systems may be run intermittently throughout the day, which can be inefficient. Instead of intermittently running such systems, those systems can be run in one (or more) longer and consecutive stretches to bring the facility temperature down to a lower temperature (below a setpoint), and can then be turned off or controlled to reduce power usage. Accordingly, inefficiencies around cooling systems being turned on and off intermittently can be reduced and/or eliminated.

In another example, operational costs for refrigeration systems can be reduced. For instance, by having the ability to time-shift the use of energy, energy consumption during peak demand can be reduced and/or eliminated, and instead shifted to non-peak periods of time. This can reduce the operational cost of cooling a facility because energy during peak periods of time is generally more expensive than non-peak time.

In another example, time-shifting strategies used by one or more facilities can, in aggregate, help to balance out energy demand for energy producers and can also help energy producers avoid waste. For instance, energy producers are typically required to have sufficient energy production capacity to meet variations in demand over time, which can result in energy producers often providing energy into the system that is ultimately wasted (unused), such as during non-peak hours of the day. By shifting energy consumption to non-peak hours, the amount of energy wasted across the system as a whole can be reduced, and also the production demands on energy producers during peak periods of time can be reduced. The refrigeration system can also be made inherently more efficient by shifting operation to certain (e.g., cooler) times of the day, so even if there is little or no imbalance between supply and demand on the grid, value can still be derived through reduced power consumption.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for systems and techniques for refrigeration management, more specifically, for the reduction of the costs associated with powering the removal of heat from cold storage facilities. The amount of power needed by a cold storage facility can vary on a daily cycle due to the sun's heat, outdoor temperatures, work shifts, etc. The demand on a utility provider generally also varies on a daily cycle as well, and some utility providers use "peak pricing" and/or variable pricing in which the cost of power goes up during times of high demand (e.g., summer mid-day), and goes down for times of low demand (e.g., night).

In the realm of electrically powered facilities, batteries or flywheels can be charged during off-peak periods to take advantage of lower, off-peak energy pricing, and discharged to power loads during on-peak periods to avoid consuming power at relatively higher, on-peak rates. Somewhat analogously, this document describes processes in which cold storage facilities are used as forms of thermal energy storage units that can be "charged" (e.g., over-chilled) during low-price energy periods and "discharged" (e.g., allowed to relax from the over-chilled state) during high-price energy periods reduce or avoid the need for power consumption during high-price periods while still keeping stored inventory at or below a predetermined temperature during the high-price periods.

In general, the cold storage facility can be pre-charged to a below-normal cooled temperature using cheaper power and/or when the facility is inherently more efficient to operate (e.g., cool hours, nighttime), and then be allowed to rise back closer to normal cooled temperatures to reduce or avoid having to draw more expensive power and/or operate during periods in which the facility is inherently less efficient to operate (e.g., peak temperature hours, daytime). For example, a freezer warehouse may normally be kept at 0° F., but in anticipation of an upcoming peak-pricing period (e.g., mid-day tomorrow during the warm season) the warehouse can be pre-cooled to −5° F. during nighttime pricing. When the peak-pricing time arrives, at least a portion of the power demand and/or cost can be reduced by allowing the warehouse to warm back toward 0° F. rather than by powering the refrigeration system using peak-priced power.

Figure 1:
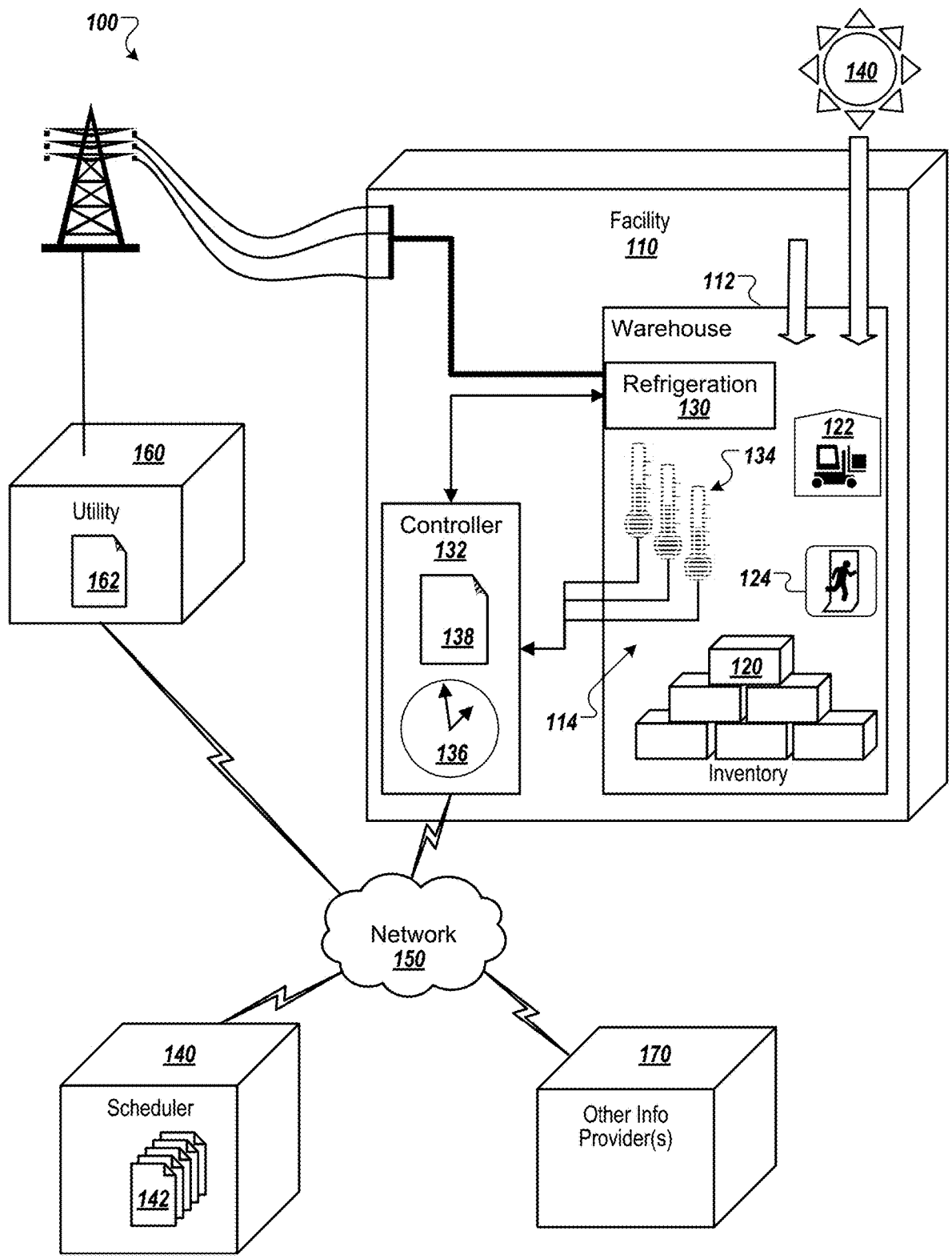
FIG. 1 is a schematic diagram that shows an example refrigeration management system.

FIG. 1 is a schematic diagram that shows an example refrigeration management system 100. A refrigeration facility 110 (e.g., cold storage facility) includes a warehouse 112 is an insulated cold storage enclosure that defines a substantially enclosed space 114. The enclosed space 114 has various content, including an inventory 120, a collection of equipment 122 (e.g., forklifts, storage racks), and air. The inventory 120, the equipment 122, and the air within the enclosed space 114 has a thermal mass, as does the material of the warehouse 112 itself (e.g., steel supports, aluminum walls, concrete floors).

The enclosed space 114 is cooled by a refrigeration system 130 that is controlled by a controller 132 based on temperature feedback signals from a collection of sensors 134 (e.g., temperature, humidity, airflow, motion). In some embodiments, the controller 132 can be a cold storage control system controller, and can include a processor, memory, storage, inputs, and outputs. The sensors 134 are distributed throughout the warehouse 112 to enable the controller 132 to monitor environmental conditions throughout the enclosed space 114, and in some embodiments, in and/or near the inventory 120 (e.g., sensors embedded in or between boxes or pallets of stored goods). The controller 132 is configured to activate the refrigeration system 130 based on feedback from the sensors 134 to keep the enclosed space 114 at a temperature below a predetermined temperature limit. For example, an operator of the refrigeration facility 110 can agree to store a customer's frozen foods (e.g., frozen meats, frozen French fries, ice cream) below a maximum of 0° F.

The warehouse 112 is configured to resist heat infiltration. Heat energy that can raise the temperature of the enclosed space 114 and its contents can come from a number of sources. A primary source of heat energy is the sun 140, which can directly warm the structure of the warehouse 112 and warms the ambient environment surrounding the warehouse 112 and the refrigeration facility 110. Such heat energy can infiltrate the warehouse 112 directly through the walls of the warehouse 112 and/or through the opening of a door 124. Other sources of heat energy can come from the operation of the equipment 122 (e.g., warm engines of forklifts, heat given off by lighting), the body heat of humans working within the enclosed space 114, and the inventory 120 itself (e.g., fresh product may arrive at 20° F. for storage in a 0° F. freezer).

The controller 132 is in data communication with a scheduler 140 by a network 150 (e.g., the Internet, a cellular data network, a private network). In some embodiments, the scheduler 140 can be a cold storage management server computer in communication with the controller 132. In some phases of operation, the controller 132 collects measurements from the sensors 134 and time stamps based on a chronometer 136 (e.g., clock, timer) and provides that information to the scheduler 140. The scheduler 140 uses such information to determine a thermal model of the warehouse 112. An example process for the determination of thermal models will be discussed further in the description of FIG. 8.

In previous designs, temperature controllers generally monitor a temperature within a freezer to turn refrigeration systems on when internal temperatures exceed a preset temperature, and turn the systems off when the internal temperatures drop to slightly below the preset temperature. This range represents the hysteresis range for the controller under nominal operational conditions. Such operational behavior is discussed further in the description of FIG. 3.

In the example of the system 100, the controller 132 receives an operational schedule 138 from the scheduler 140. In general, the schedule 138 includes information that causes the controller 132 to precool the enclosed space 114 to a temperature below the predetermined temperature limit for the inventory 120, and in some examples, below a hysteresis range for normal operation of the refrigeration system 130, during one or more predetermined periods of time. For example, under nominal operational conditions the controller 132 may be configured to keep the enclosed space below 0° F. by turning the refrigeration system 130 on when a temperature within the warehouse 112 exceeds −1° F., and turns the refrigeration system 130 off when the temperature drops below −2° F. However, the schedule 138 may configure the controller to cool the enclosed space toward −5° F. or some other predetermined temperature during one or more predefined periods of time. As will be described in more detail below, such periods of time can proceed periods of time in which the price of power is relatively higher (e.g., peak pricing periods, periods of inherently low system efficiency).

The scheduler 140 is configured to determine one or more operational schedules 142, of which the operational schedule 138 is one. The scheduler 140 determines the operational schedules 142 based on thermal models. The scheduler receives thermal model information about the refrigeration facility 110, such as timed readings from the sensors 134 and operational information about the refrigeration system 130, to determine a thermal model of the warehouse 112. Determination of thermal models is discussed in more detail in the description of FIG. 8.

The scheduler 140 also determines the operational schedules 142 based on an energy cost schedule 162 provided by a utility provider 160 that provides power to the refrigeration facility 110. The energy cost schedule 162 includes information about the cost of energy at different times and/or different days. For example, the utility provider 160 can be an electric power provider that normally charges $0.12 per kilowatt-hour (kWh), but increases the cost to $0.20 per kilowatt-hour consumed between 10 am-2 pm because demand for electrical power may peak during that time. In another example, the utility provider 160 may charge more during the summer months than during the winter months due to the seasonal demand caused by air conditioners and other cooling systems such as the refrigeration system 130. In general, the energy cost schedule 162 describes one or more future cycles (e.g., daily) where power costs are scheduled to go up and down. Determination of operational schedules is discussed in more detail in the description of FIG. 9.

One or more other information providers 170 are configured to provide other information to the refrigeration facility 110, the scheduler 140, and/or the utility provider 160 over the network 150. For example, the information provider 170 can be a metrological service information server computer that provides daily or hourly weather forecasts. In such an example, the utility provider 160 may use a forecast of hot weather to predict increased demand and attempt to incentivize reduced demand by increasing the cost of power during hot hours, and/or the scheduler 140 may use the forecast to determine operational schedules 142 that pre-chill the warehouse 112 in anticipation of hot weather than increased heat influx. In another example, the utility provider 160 may provide signals for demand response events, and/or the scheduler 140 may use the signals to modify operational schedules 142. In yet another example, the information provider 170 can be a solar or wind energy provider, and can provide a forecast of surplus solar or wind energy (e.g., a particularly sunny or windy day) that would be available to pre-chill the warehouse 112.

In some embodiments, the information provider 170 can be a production or logistics scheduler. For example, the information provider 170 may provide information to the scheduler 140 that indicates that a high level of activity may be planned for the warehouse 112 between 4 pm and 5 pm tomorrow. Since high levels of activity may include increased output of heat by the equipment 122 and workers, and more frequent or prolonged openings of the door 124 that might alter the thermal model of the warehouse 112. The scheduler 140 may respond by pre-chilling the enclosed space in anticipation of this predicted activity and the predicted influx of heat.

In yet another example, the information provider 170 may provide information to the scheduler 140 about the inventory 120. Different types of inventory can have different thermal characteristics. For example, a pallet of ice cream in plastic pails may absorb and release heat energy in different amounts and at different rates than a pallet of cases of onion rings packaged in plastic bags within corrugated cardboard boxes. In some embodiments, the scheduler 140 can use information about the thermal properties the inventory 120 or changes in the inventory 120 to modify the thermal model and modify the operational schedules 142 to account for changes to the thermal model. For example, the scheduler 140 prescribe a longer precooling period than usual when the inventory 120 includes items having unusually high thermal capacities and/or items that are stored in well-insulated containers.

Different types of inventory can also enter the warehouse 112 in different states. For example, the information provider 170 may provide information to the scheduler 140 that indicates that a large inventory of seafood at 10° F. is due to arrive at a 5° F. warehouse at 9 am tomorrow. The scheduler 140 may modify the operational schedules 142 to offset the effect cooling the seafood from the incoming 10° F. to the warehouse's setpoint of 5° F. while also anticipating and offsetting the effects of variable energy pricing by prescribing a longer and/or colder period of pre-cooling.

Figure 2:
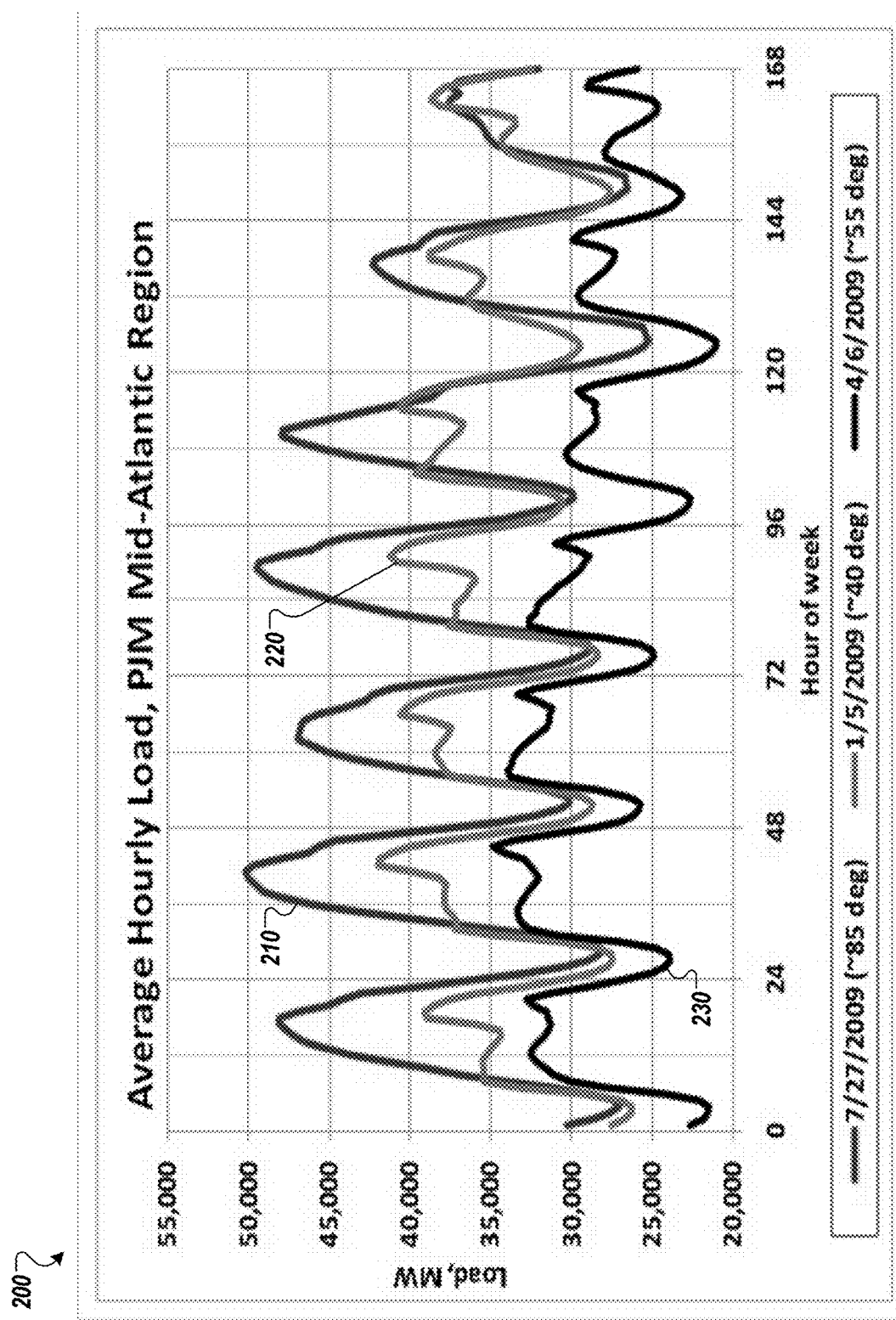
FIG. 2 is a graph of three example hourly power loads.

FIG. 2 is a graph 200 of three example hourly power loads on a utility provider, such as the example utility provider 160 of FIG. 1. A demand curve 210 shows an example of average hourly power load for the Mid-Atlantic region of the United States for the week of Jul. 7, 2009, when the average temperature was 85° F. A demand curve 220 shows an example of average hourly power load for the Mid-Atlantic region of the United States for the week of Jan. 5, 2009, when the average temperature was 40° F. A demand curve 230 shows an example of average hourly power load for the Mid-Atlantic region of the United States for the week of Apr. 6, 2009, when the average temperature was 55° F.

Each of the demand curves 210-230 shows that average hourly power loads varies on a substantially daily cycle, peaking around noon each day, and reaching a low point just after midnight each day. In the illustrated example, each of the demand curves 210-230 starts on a Monday, and shows that average hourly power loads varies on a substantially weekly cycle. For example, the demand curve 210 shows higher peak demands for the first five cycles of the week (e.g., the work week, peaking around 47,000 MW around noon on Monday through Friday) and is on average lower for the sixth cycle of the week (e.g., peaking around 43,000 MW around noon on Saturday) and even lower for the seventh cycle (e.g., peaking around 38,000 MW Sunday, when even fewer businesses are open and consuming power).

Power utilities generally build out their infrastructure in order to enough power to avoid brownouts and outages under as many circumstanced as practical. That generally means having enough power generating capacity to accommodate expected peak loads. However, during off-peak times the utility may have excess power generation capacity that is going unused while still incurring overhead costs. As such, utility providers may be incentivized to minimize excess power production capacity and maximize unused production capacity. One way that utility providers can do this is by incentivizing power consumers to reduce their demand for power during peak times and possibly shift that demand to off-peak times. Customers can be incentivized by varying the cost of power consumption such that the price for power during peak times is relatively higher, and the price during off-peak times is relatively lower.

Figure 3:
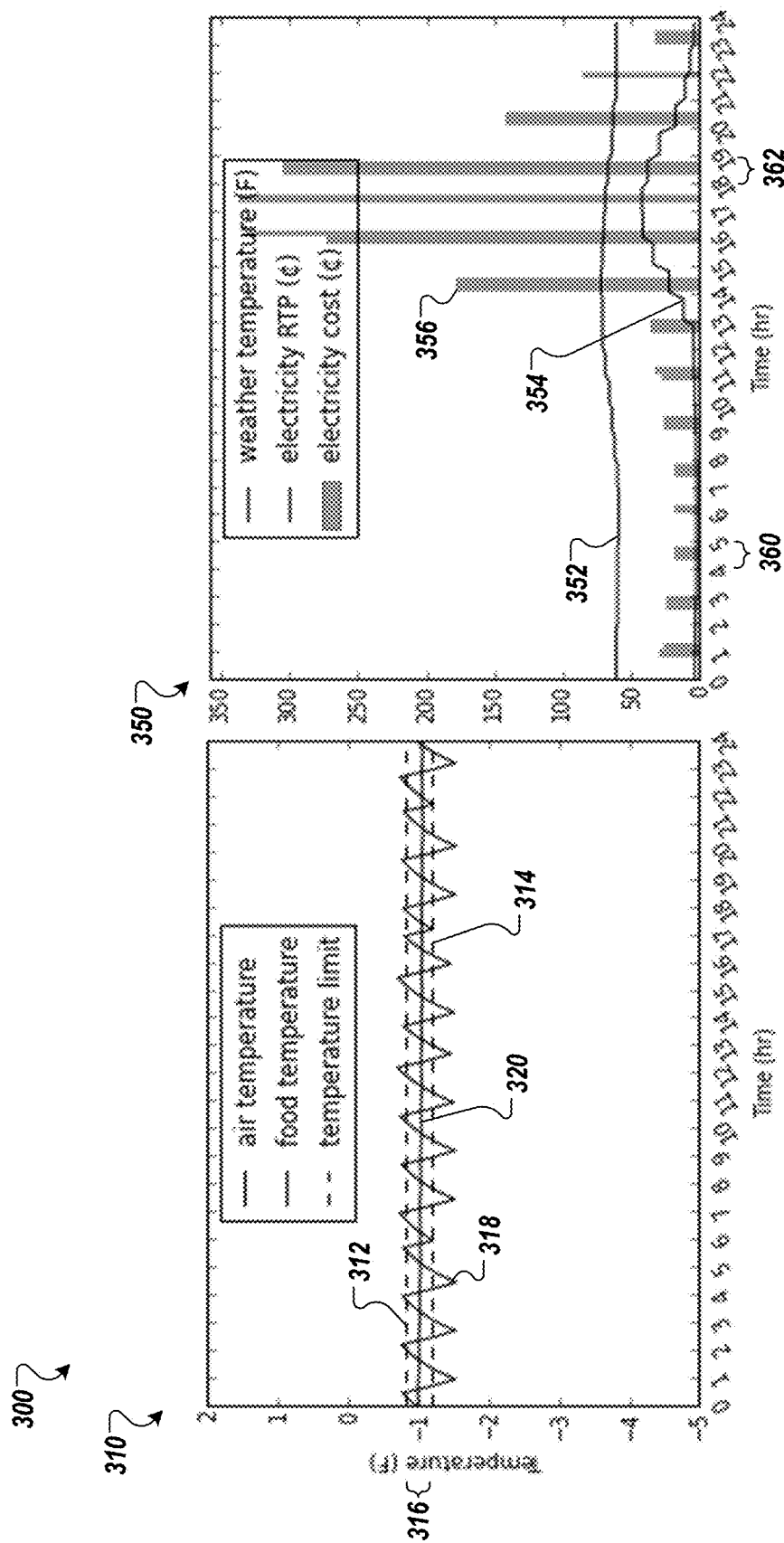
FIG. 3 is a graph of example temperature, example power use, and example power costs without precooling.

FIG. 3 is a graph 300 of example temperature, example power use, and example power costs without precooling. In some implementations, the graph 300 can be an example of the behavior of a refrigeration facility that is not configured to use operational schedules such as the example operational schedules 138, 142 of FIG. 1. The graph 300 includes a subgraph 310 and a subgraph 350.

The subgraph 310 is a chart of an example temperature curve over an example 24-hour period. In general, refrigeration systems do not run 100% of the time, and unmanaged refrigeration systems cycle on and off based on thermostatic control. The subgraph 310 shows an example upper temperature limit 312 that is set slightly above −1° F., and a lower temperature limit 314 set slightly below −1° F. The upper temperature limit 312 and the lower temperature limit 314 define an example hysteresis for a thermostatic controller for a cold storage unit, such as the controller 132 of the example refrigeration management system 100. An air temperature curve 318 cycles approximately between the upper temperature limit 312 and the lower temperature limit 314 and the thermostatic controller turns a refrigeration system on when the upper temperature limit 312 is exceeded, and turns the refrigeration system off when the lower temperature limit 314 is reached. The air temperature curve 318 cycles around −1° F., and maintains an inventory (e.g., frozen food) temperature setpoint 320 substantially close to −1° F. In some embodiments, the inventory can have a greater thermal mass than air, and therefore the inventory temperature can exhibit a dampened thermal response compared to the air that can provide an averaging effect relative to the oscillations of the surrounding air temperature 318.

The subgraph 350 compares three other sets of data over the same 24-hour period as the subgraph 310. A weather temperature curve 352 shows an example of how the temperature of ambient (e.g., outdoor) temperatures vary during the example 24 hour period. A real-time price curve 354 shows an example of how a power utility can vary the price of power (e.g., electricity) over the 24-hour period. As can be seen from the curves 352 and 354, as the weather temperature 352 rises the real-time price 354 rises, albeit lagging slightly. In some examples, as the weather temperature 352 rises, power demand can rise with a delay (e.g., possibly because outdoor temperatures could rise more quickly than building interiors, thereby causing a delay before air conditioning systems and refrigeration systems would be thermostatically triggered), and such increased power demand may be disincentivized by the power provider by raising the cost of power during such peak times.

The subgraph 350 also shows a collection of power cost curves 356. The areas underneath the power cost curves 356 represents the amount of money consumed (e.g., cost) as part of consuming power, based on the real time price 354, during various periods of time within the 24 hour period. For example, the areas under the power cost curves 356 can be summed to determine a total cost of the power consumed during the example 24-hour period.

The power cost curves 356 correspond time wise with the drops in the air temperature curve 318. For example, when the refrigeration system 130 is turned on, power is consumed as part of causing the air temperature within the warehouse 114 to drop. In the illustrated example, the air temperature curve 318 and the power cost curves 356 show a periodicity, with periods of power consumption lasting about 25 minutes approximately every two hours. However, even though the duration of the power consumption cycles shown by the power consumption curves 356 are roughly equal in length, they vary greatly in height. For example, a cycle 360 has significantly less volume and therefore less total cost relative to a cycle 362. The difference in the costs between the cycles 360 and 362 is substantially based on the difference in the real time price 354 at the time of the cycle 360 and the relatively higher real time price 354 at the time of the cycle 362.

As described earlier, the graph 300 shows an example of the behavior of a refrigeration facility that is not configured to use operational schedules such as the example operational schedules 138, 142 of FIG. 1. For example, the graph 300 shows that power consumption occurs with a substantially regular frequency regardless of the real time price 354.

Figure 4:
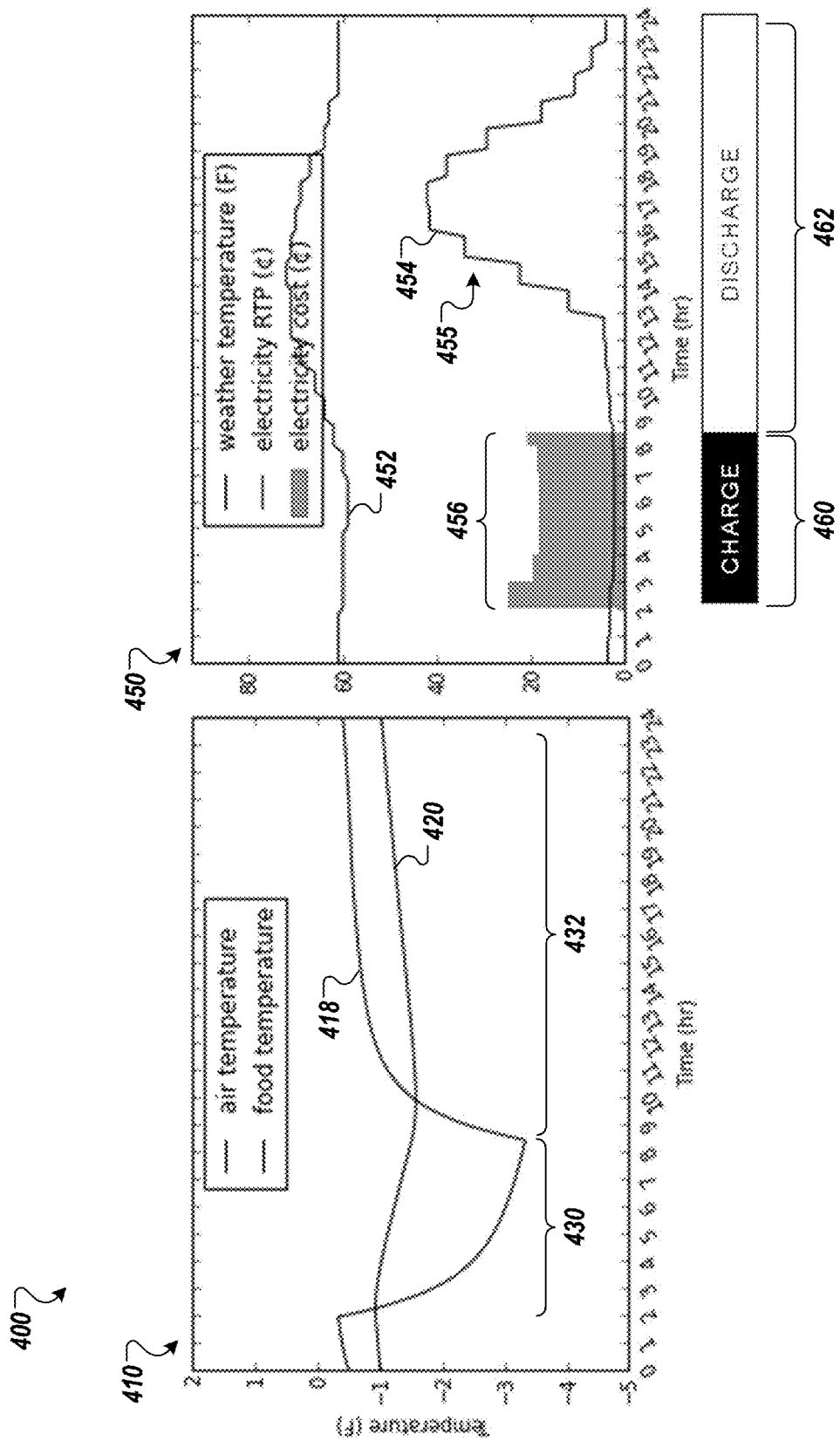
FIG. 4 is a graph of example temperature, example power use, and example power costs in an example in which precooling is used.

FIG. 4 is a graph 400 of example temperature, example power use, and example power costs in an example in which precooling is used. In general, refrigeration systems do not run 100% of the time, and unmanaged refrigeration systems cycle on and off based on thermostatic control. However, refrigeration system, such as the example refrigeration system 100 of FIG. 1, can use predetermined schedules in order to shift their "on" times and "off" times to predetermined times of the day in a way that can reduce operational costs. In some implementations, the graph 400 can be an example of the behavior of a refrigeration facility that is configured to use operational schedules such as the example operational schedules 138, 142 of FIG. 1. The graph 400 includes a subgraph 410 and a subgraph 450.

The subgraph 410 is a chart of several temperature curves over an example 24-hour period. An air temperature curve 418 varies as a thermostatic controller turns a refrigeration system on and off. The air temperature curve 418 cycles around −1° F., and maintains an inventory (e.g., frozen food) temperature curve 420 substantially close to −1° F. In some embodiments, the inventory can have a greater thermal mass than air, and therefore the inventory temperature 420 can exhibit a dampened thermal response compared to the air that can provide an averaging effect relative to the oscillations of the surrounding air temperature 418.

The air temperature curve 418 includes a large drop 430 starting around 2 am and ending around 8 am. The air temperature curve 418 also includes a large rise 432 starting around 8 am and continuing for the rest of the day. The inventory temperature 420 varies as well, but to a far lesser degree (e.g., due to the relatively greater thermal capacity of solid matter compared to air), varying by only a couple of tenths of a degree around −1° F.

The subgraph 450 compares three other sets of data over the same 24-hour period as the subgraph 410. A weather temperature curve 452 shows an example of how the temperature of ambient (e.g., outdoor) temperatures vary during the example 24 hour period. A real-time price curve 454 shows an example of how a power utility can vary the price of power (e.g., electricity) over the 24-hour period. As can be seen from the curves 452 and 454, as the weather temperature 452 rises the real-time price 454 rises, albeit lagging slightly. In some examples, as the weather temperature 452 rises, power demand can rise with a delay (e.g., possibly because outdoor temperatures could rise more quickly than building interiors, thereby causing a delay before air conditioning systems and refrigeration systems would be thermostatically triggered), and such increased power demand may be disincentivized by the power provider by raising the cost of power during such peak times.

The subgraph 450 also shows a power cost curve 456. The area underneath the power cost curve 456 represents the amount of money consumed (e.g., cost) as part of consuming power, based on the real time price 454, during various periods of time within the 24 hour period. The area under the power cost curve 456 can be summed to determine a total cost of the power consumed during the example 24-hour period.

The power cost curve 456 corresponds time wise with the drop 430 in the air temperature curve 418. For example, when the refrigeration system 130 is turned on, power is consumed as part of causing the air temperature within the warehouse 114 to drop. Unlike the example graph 300 of FIG. 3, which shows power consumption that occurs with a substantially regular frequency regardless of the real time price 354, the graph 400 shows that the power cost curve 456 is offset in advance of a peak 455 in the real time price curve 454.

In the illustrated example, the power cost curve 456 occurs in advance of the peak 455 due to an operational schedule, such as the example operational schedule 138, provided by a scheduler such as the example scheduler 140 and executed by a controller such as the example controller 130 to precool an enclosed space and inventory such as the example enclosed space 114 and the example inventory 120. In the illustrated example, an enclosed space is cooled and power is consumed during a charging period 460 that proceeds a discharge period 462.

During the charging period 460, the air temperature 418 is cooled below a nominal target temperature. For example, there may be a requirement that the inventory temperature 420 not be allowed to rise able 0° F., and therefore the corresponding refrigeration system may be configured to thermostatically control the air temperature 418 to normally cycle around −1° F., with a hysteresis of about +/−0.2° F. However, during the charging period 460, the refrigeration system may be configured to cool the air temperature 418 toward approximately −3.5° F.

The charging period 460 occurs in advance of the peak 455 in the real time price 454. As such, power consumption happens when power is relatively less expensive (e.g., the height of the power cost curve 456 is comparatively lower than the example power cost curve 356). During the discharge period 462, the air temperature 418 is allowed to relax back toward the ~−1° F. threshold, rather than consume power that is more expensive during the peak 455 of the power cost curve 454. By scheduling the charge period 460 (e.g., extra precooling during low-cost power times) and the discharge period 462 (e.g., allowing temperatures to partly relax during high-cost power times), the total cost associated with the power cost curve 456 can be less than the total cost associated with unscheduled operations such as those represented by the sum of the power cost curves 356.

Figure 5:
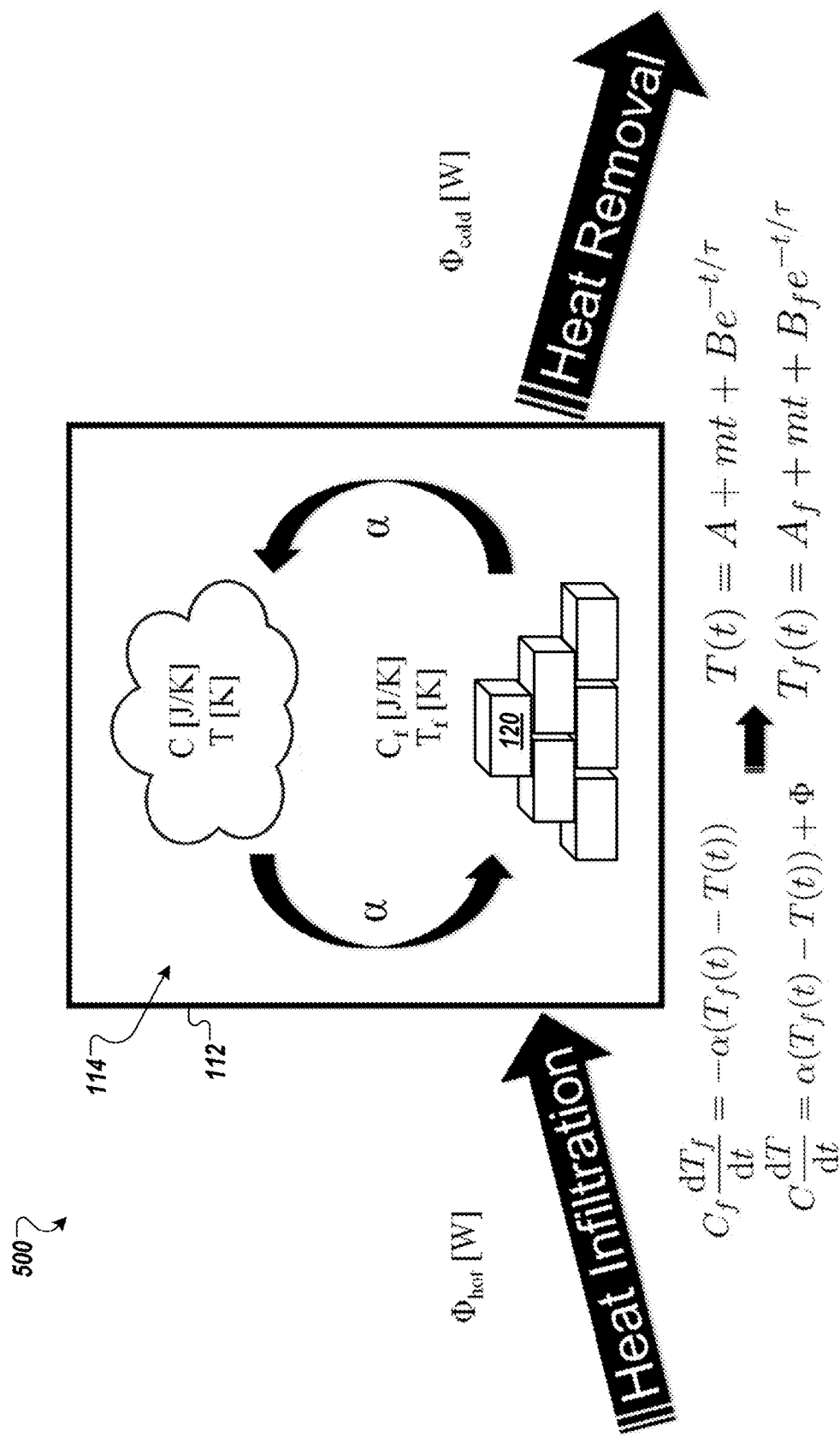
FIG. 5 is a conceptual diagram of a thermal model.

FIG. 5 is a conceptual diagram of a thermal model 500 of the warehouse 112 of the example refrigeration system 100 of FIG. 1. In general, the thermal behavior of a refrigerated space can be mathematically modeled as a dampened harmonic oscillator. In some implementations, the thermal behavior of a refrigerated space in response to powered cooling and passive heating (e.g., heat intrusion) can mathematically approximate the electrical behavior of a battery in response to powered charging and passive discharge through a load (e.g., self-discharge). For example, the enclosed space 114 within the warehouse 112 can be "charged" by removing an additional amount of heat energy (e.g., dropping the temperature below the normal operating temperature, generally by using electrical power) from the air and the inventory 120, and can be "discharged" by allowing heat to infiltrate the enclosed space 114 (e.g., until the normal operating temperature is reached).

The thermal model 500 can be determined at least partly by empirical measurement. For example, the enclosed space 114 can start at an initial temperature (e.g., −1° F.), and cooled to a predetermined lower temperature (e.g., −5° F.). The cooled air and the inventory 120 exchange thermal energy as the temperature changes. A collection of temperature sensors distributed within the enclosed space 114 can be monitored to determine when the enclosed space 114 has reached the lower temperature. When the lower temperature has been reached and/or stabilized, the warehouse's 112 refrigeration system can be partly turned down or completely turned off (e.g., thereby reducing power usage) and the sensors can be used to monitor the dynamic temperature changes across the enclosed space 114 as heat intrusion causes the enclosed space 114 to gradually warm (e.g., back toward −1° F.), with the air and the inventory 120 absorbing some of the heat that infiltrates the enclosed space 114.

The rates at which the enclosed space 114 cools and warms can be analyzed to estimate the thermal capacity and/or determine the thermal resistance of the warehouse 112. In some embodiments, the thermal capacity can be based on the refrigeration capacity of the warehouse 112 (e.g., the perturbance capacity of the system, the size of the refrigeration system 130), the volume of the air and the volumes and the types of materials that make up the inventory 120 (e.g., thermal capacity of frozen fish versus frozen concentrated orange juice, paper packaging versus metal packaging).

In some embodiments, the thermal resistance can be based on the insulative qualities of the warehouse 112, the insulative qualities of the inventory 120 (e.g., stored in plastic vacuum sealed packages versus corrugated cardboard boxes), heat given off by workers and/or equipment within the warehouse 112, and the frequency with which doors to the warehouse 112 are opened to ambient temperatures. In some embodiments, some or all of the terms of the thermal model 500 can be determined by performing a thermal modeling cycle and monitoring the thermal response of the warehouse 112. For example, if the thermal modeling cycle is performed while a particular type and volume of the inventory 120 is stored, while particular amounts of equipment and workers are used in the enclosed space 114, and while the doors to the enclosed space 114 are opened and closed with a particular frequency, then the resulting thermal model can inherently include terms that reflect those variables without requiring these contributing factors to be determined ahead of time.

The mathematical embodiment of the thermal model 500 takes the form of differential equations such as:

$$C_f \frac{dT_f}{dt} = -\alpha(T_f(t) - T(t))$$

And:

$$C\frac{dT}{dt} = \alpha(T_f(t) - T(t)) + \Phi$$

In which $\phi$ represents net thermal flux, $\alpha$ represents the thermal coupling coefficient between the food and air, C represents the effective heat capacity of the air, $C_f$ is the effective heat capacity of the inventory, $T_f$ represents the temperature of the inventory, and T represents the temperature of the air.

The preceding equations can be solved analytically or numerically in order to determine the time-dependent air and inventory temperature. The model is analogous to and approximates the dynamics of a dampened simple harmonic oscillator. In thermal harmonic oscillator form, the preceding equations can be presented as:

$$T(t) = A + mt + Be^{-t/\tau}$$

And:

$$T_f(t) = A + mt + B_f e^{-t/\tau}$$

Figure 6:
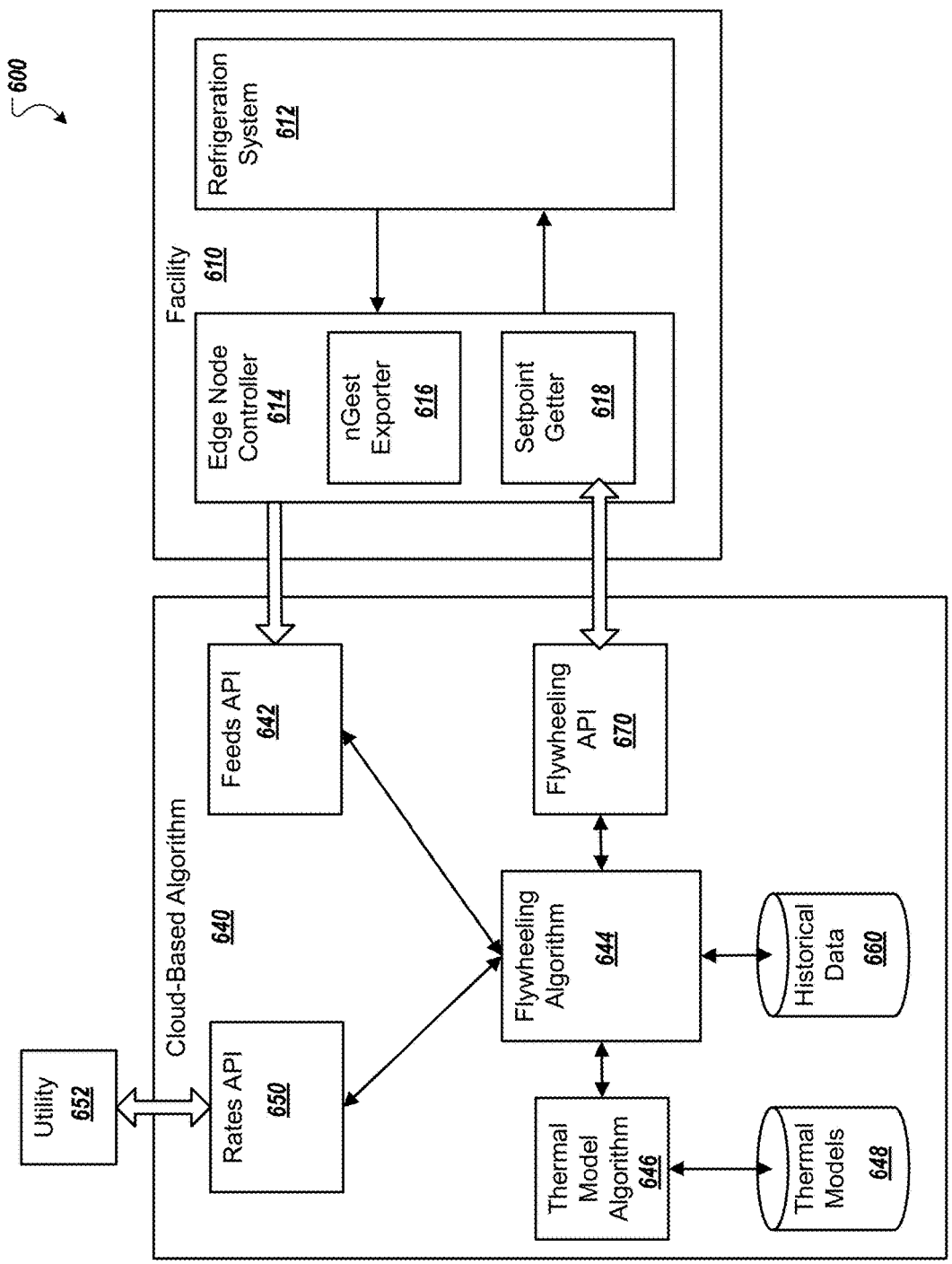
FIG. 6 is a block diagram of an example refrigeration management system.

FIG. 6 is a block diagram of an example refrigeration management system 600. The system 600 illustrates example interactions between a facility 610 and a cloud-based algorithm 640. In some embodiments, the facility 610 can be the refrigeration facility 110 of the example refrigeration management system 100 of FIG. 1. In some embodiments, the cloud-based algorithm 640 can be the scheduler 140.

The facility 610 includes a refrigeration system 612. In some embodiments, the refrigeration system can be configured to cool an enclosed space. For example, the refrigeration system 612 can be the refrigeration system 130.

The facility 610 includes an edge node controller 614 in communication with the refrigeration system 612. The edge node controller includes an export module 616 and a setpoint module 618. Export module 616 is configured to export information received from the refrigeration system 612, such as measured temperature values, temperature setpoint values, operational status information, and/or other information from the refrigeration system 612. The setpoint module 618 is configured to receive operational schedules from the cloud-based algorithm 640. In some embodiments, the context cluster 640 can be a server computer system and the edge node controller 614 can be a client processor system. The edge node controller 614 is configured to perform functions based on the operational schedules, such as turning the refrigeration system 612 on and off (e.g., or to a reduced power configuration) at predetermined times, and/or configuring temperature setpoints for the refrigeration system 612 at predetermined times.

The cloud-based algorithm 640 includes a feeds application programming interface (API) 642. The feeds API 642 provides a programmatic communications endpoint that is configured to receive operational information from the edge node controller 614. The operational information includes timed temperature measurements from one or more sensors located throughout the refrigeration system 612. In some implementations the operational information can also include information such as refrigeration capacity information (e.g., a schedule that indicates that 10% of the chillers used by the refrigeration system 612 will be offline for maintenance tomorrow), operational volume information (e.g., how full the warehouse is expected to be), operational status information (e.g., the facility 610 will be operating when it is normally closed, and doors and equipment will be contributing heat when they normally would not, such as during a temporary second work shift or on a Sunday).

The feeds API 642 provides the information it receives to a flywheeling algorithm 644. The flywheeling algorithm 644 also includes the convex optimization logic that determines operational schedules for the refrigeration system 612. In general, the flywheeling algorithm 644 determines operations schedules that can cause the refrigeration system 612 to precool a cold storage space, and then allow the space to "flywheel", "coast", "discharge" or otherwise allow the temperature of the space to rise for a period of time without needing to consume power in order to keep the storage space below a predetermined maximum temperature limit.

The flywheeling algorithm 644 communicates with a thermal modelling algorithm 646 that includes the software logic that determines thermal models for spaces, such as the spaces cooled by the refrigeration system 612, based on the operational information received by the feeds API 642. The thermal modelling algorithm 646 is configured to store and retrieve thermal models in a thermal models database 648. In some implementations, the thermal models can be the example thermal model 500 of FIG. 5.

The flywheeling algorithm 644 communicates with a power rates API 650. The power rates API 650 provides a communications interface to a utility provider 652. The power rates API 650 enables the cloud-based algorithm 640 to request and/or receive energy cost schedules from the utility provider 652. For example, the power rates API 650 could be used to receive the energy cost schedule 162 of FIG. 1 from the utility provider 160.

A historical data database 660 stores historical data that can be retrieved by the flywheeling algorithm 644. For example, the historical data database 660 can store multiple sets of operational information for the facility 610 over time, and the flywheeling algorithm 640 can use such historical data as part of a process of determining operational schedules. For example, the flywheeling algorithm 644 can look at multiple sets of historical data to determine that the facility 610 warms up more quickly on Mondays, has an average amount of warming on Tuesdays-Fridays, and has little warming on Saturdays and Sundays (e.g., Mondays may be heavy shipping days with lots of activity and door openings, and the facility 610 may be closed for business on weekends and therefore have few to zero door openings). In another example, the flywheeling algorithm 644 can look at multiple sets of historical data to determine that the facility 610 warms up more quickly in the summer than in the winter. The flywheeling algorithm 644 can use information such as this to predict and/or improve estimations of the thermal model of the facility 610 for various days, seasons, and other operational variables.

The flywheeling algorithm 644 uses the energy cost schedules received by the power rates API 650, the thermal models determined by the thermal model algorithm 646, the operational information received by the feeds API 642, and the historical data retrieved from the historical data database 660 to determine one or more operational schedules for the refrigeration system 612. For example, the flywheeling API 670 can determine the operational schedules 138 and 142 of FIG. 1.

A flywheeling API 670 provides a communication interface between the cloud-based algorithm 640 and the edge node controller 614. The flywheeling API 670 can transmit operational schedules that are received by the setpoint getter 618. The edge node controller 614 uses operational schedules received by the setpoint getter 618 to operate the refrigeration system 612. The operational schedules include information that can cause the edge node controller 614 to operate the refrigeration system 612 to chill a freezer or other enclosed space to a lower temperature (e.g., prechilling, charging) during times when power is relatively less expensive and/or when the refrigeration system 612 can be operated more efficiently (e.g., during cooler hours), and allow the temperatures to rise while not operating (e.g., discharging, flywheeling, coasting, relaxing) during other times when power is relatively more expensive (e.g., peak pricing periods) and/or less efficient (e.g., hot hours of the day).

Figure 7:
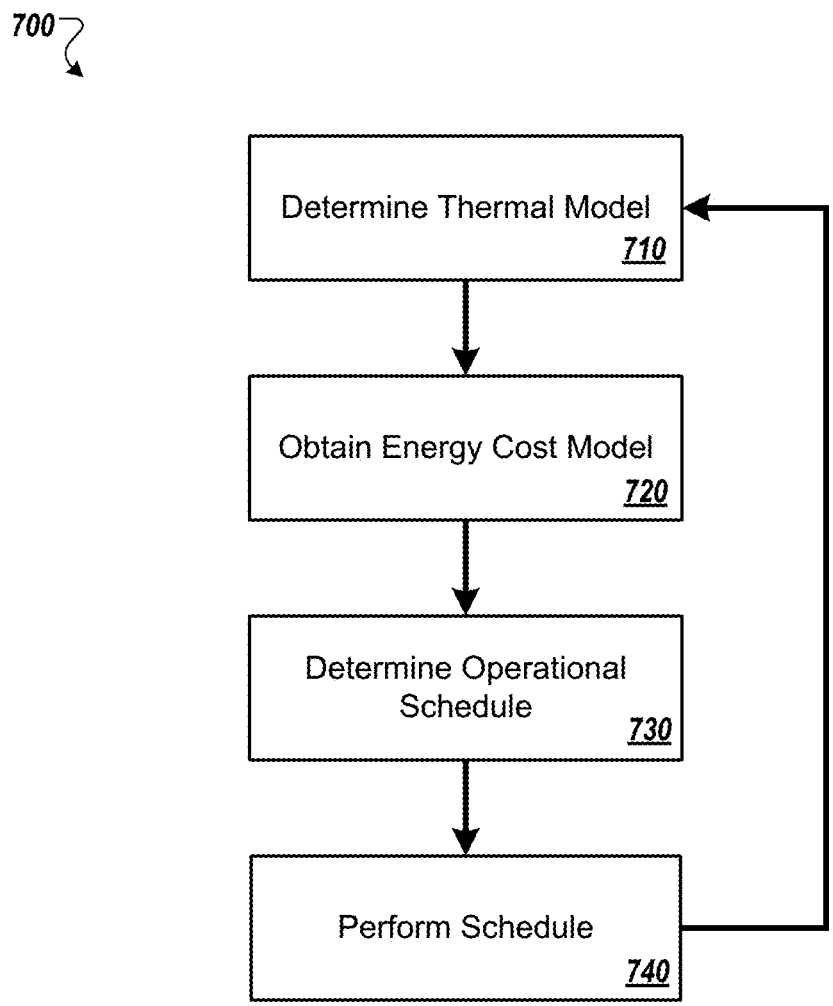
FIG. 7 is a flow diagram of an example process for refrigeration management.

FIG. 7 is a flow diagram of an example process 700 for refrigeration management. In some implementations, the process 700 can be performed by parts or all of the example refrigeration management system 100 of FIG. 1 or the example refrigeration management system 600 of FIG. 6.

At 710, a thermal model of a cold storage facility comprising a cold storage enclosure that is configured to be cooled by a refrigeration system and defining an enclosed space is determined. For example, the scheduler 140 can receive timed readings from the sensors 134 and operational information about the refrigeration system 130, to determine a thermal model of the warehouse 112.

In some implementations, the thermal model can be representative of at least one of the thermal capacity of content within the enclosed space, and the thermal resistance of the cold storage enclosure. For example, the air and the inventory 120 within the enclosed space 114 would have a combined thermal capacity, and the construction (e.g., insulative properties, areas of doors) of the warehouse 112 would contribute to the thermal resistance of the warehouse 112.

At 720, an energy cost model is obtained. The energy cost model describes a schedule of variable energy costs over a predetermined period of time in the future. For example, the scheduler is configured to receive the energy cost schedule 162 from the utility provider 160. The energy cost schedule 162 includes information about the cost that the utility provider 160 charges for energy at different times and/or different days.

At 730, an operational schedule is determined for at least a portion of the refrigeration system based on the thermal model, the energy cost model, and a maximum allowed temperature for the enclosed space. For example, the scheduler 140 can determine the operational schedules 142 based on an energy cost schedule 162, the nominal temperature setpoint of the refrigeration facility 110, and the example thermal model 500 of FIG. 5.

In some implementations, determining the operational schedule based on the thermal model, the energy cost model, and the maximum allowed temperature for the cold storage facility can include identifying, based on the energy cost model, a first period of time during which energy costs a first amount per unit, identifying, based on the energy cost model, a second period time preceding the first period of time, during which energy costs a second amount per unit that is less than the first amount per unit, adding information descriptive of the second period of time to the operational schedule, the information being representative of time during which the refrigeration system is to be powered on to cool the enclosed space below the maximum allowed temperature; and adding information descriptive of the first period of time to the operational schedule, the information being representative of time during which the enclosed space is allowed to warm toward the maximum allowed temperature. For example, the scheduler 140 can analyze the energy cost schedule 162 to identify a period of time in which the per-unit cost of power (e.g., dollars per kilowatt hour for electricity) is relatively high, and then identify another period of time in which the per-unit cost of power is relatively lower and precedes the high-cost period (e.g., identify a low price period that occurs before a peak price period). The scheduler 140 can then determine that at least a portion of the low-price period is to be used for chilling the enclosed space 114 an additional amount below the nominal temperature setpoint. The scheduler 140 can also determine that the refrigeration system 130 should not be operated any more than necessary to maintain the maximum temperature setpoint of the inventory 120. As such, the schedule can cause the controller 132 to provide the enclosed space 114 with an extra thermal charge of cooling using cheap power so the inventory can stay below the maximum temperature for at least a while without consuming expensive power.

In some implementations, determining the thermal model of the enclosed space can include powering on the portion the refrigeration system based on the operational schedule, cooling, by the powered portion of the refrigeration system, the enclosed space to a temperature below the maximum allowed temperature, reducing power consumption of the powered portion of the refrigeration system based on the operational schedule, determining a first plurality of temperature levels sensed by the plurality of temperature sensors, permitting the enclosed space to be warmed by ambient temperatures toward the maximum allowed temperature, determining a second plurality of temperature levels sensed by the plurality of temperature sensors, and determining a thermal capacity of content of the enclosed space. For example, the controller 132 can turn the refrigeration system 130 on and keep it on until a predetermined condition is set, such as by setting the temperature setpoint to a temperature below what the enclosed space 114 will reach in a practical amount of time (e.g., −20° F.) to cause the refrigeration system 130 to run substantially constantly for a predetermined amount of time. In another example, the controller 132 can run the refrigeration system 130 until a predetermined temperature (e.g., −6° F.) has been reached and/or stabilized. The controller 132 can then shut the refrigeration system 130 off (e.g., or reduce power usage) and start recording the temperatures sensed by the sensors 134 to over time as the enclosed space 114 is allowed to warm. The controller 132 and/or the scheduler 140 can process the timed temperature measurements to determine the thermal model 500.

In some implementations, determining the operational schedule can be based on demand charges. Demand charges are somewhat analogous to a speeding ticket. The utility can charge a fee (i.e., demand charge) based on the maximum power draw for the month, and in some examples this fee can be as much as 50% of the power bill. The scheduler 140 can be configured to account for such fees when determining the schedule, in order to prevent too much of the refrigeration equipment from turning on at once even when power rates are relatively low.

At 740, the operational schedule is performed. In some implementations, the operational schedule can include powering on a portion of the refrigeration system based on the operational schedule, cooling, by the powered portion of the refrigeration system, the enclosed space to a temperature below the maximum allowed temperature, reducing power usage of the powered portion of the refrigeration system based on the operational schedule, and permitting the enclosed space to be warmed by ambient temperatures toward the maximum allowed temperature. For example, based on the operational schedule 138, the controller 132 can cause the refrigeration system 130 to cool the enclosed space 114 by an additional amount below the nominal temperature setpoint during a period of time during which the utility provider 160 charges a relatively lesser price for power, and stops the additional cooling and allows the enclosed space 114 to warm back toward the predetermined nominal temperature threshold during a period of time during which the utility provider 160 charges a relatively greater price for power.

In some implementations, the process 700 can also include determining a measured temperature of the enclosed space, and powering on at least a portion of the refrigeration system based on the determined measured temperature and a predetermined threshold temperature value that is less than the maximum allowed temperature. For example, the controller 132 can allow the enclosed space 114 to warm back toward a predetermined maximum temperature (e.g., from −4.1° F. to a limit of −1.3° F.) and once the predetermined maximum temperature is approached, the refrigeration system 130 can resume normal operations (e.g., consuming power as needed in order to keep the enclosed space 114 at or below −1.3° F.).

Figure 8:
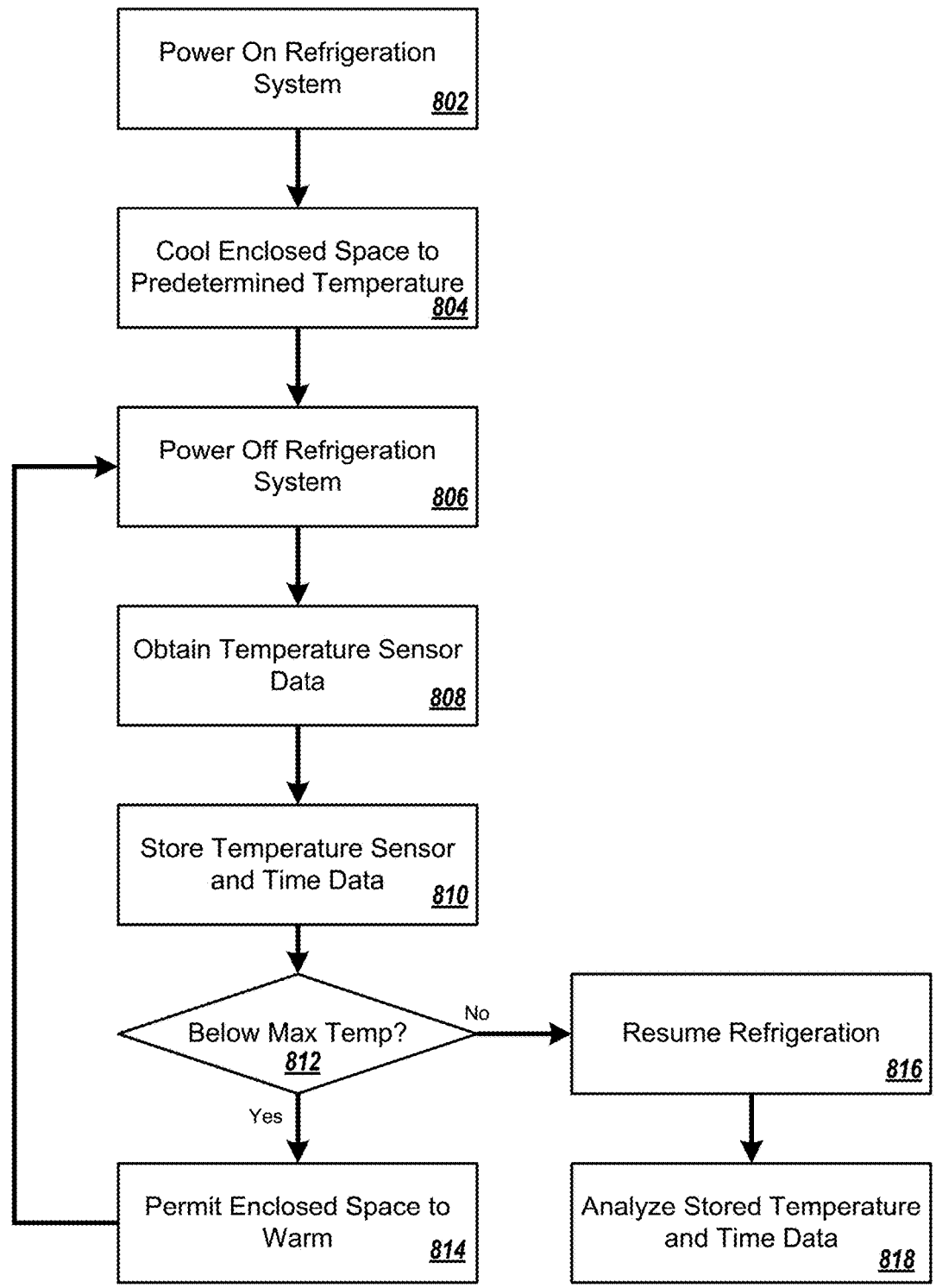
FIG. 8 is a flow diagram of an example process for determining a thermal model.

FIG. 8 is a flow diagram of an example process 800 for determining a thermal model. In some implementations, the process 800 can be the example step 710 of FIG. 7. In some implementations, the process 800 can be performed by parts or all of the example refrigeration management system 100 of FIG. 1 or the example refrigeration management system 600 of FIG. 6. In some implementations, the process 800 can be used to determine the example thermal model 500 of FIG. 5.

At 802, a refrigeration system is powered on. For example, the controller 132 can configure the refrigeration system 130 to power on by setting the target temperature to −4° F.

At 804, an enclosed space is cooled to a predetermined temperature. For example, the enclosed space 114 and the inventory 120 can be cooled to −4° F.

At 806, the refrigeration system is turned off. For example, the controller 132 can configure the refrigeration system 130 to power off by setting the target temperature to −1° F. In some implementations, the refrigeration system can be put into a reduced power consumption configuration instead of being turned off. For example, half or three-quarters of the chillers in a system can be turned off while the remainder are left powered on. In another example, some or all of the refrigeration system can be modulated (e.g., pulsed) to operate only in several-minute intervals when needed.

At 808, temperature sensor data is obtained. At 810, the temperature sensor and time data is recorded. For example, the controller 132 can monitor the sensors 134 to record temperature readings from within the enclosed space 114 along with time-stamp information based on the chronometer 136.

At 812, a determination is made. If the temperature of the enclosed space is below a predetermined maximum temperature setpoint (e.g., chosen to prevent the inventory 120 from getting too warm), then the enclosed space is allowed to continue warming at 814. If the temperature of the enclosed space is not below the predetermined maximum temperature setpoint, then refrigeration resumes at 816 (e.g., the refrigeration system 130 is turned back on).

At 818, the stored temperature and time data is analyzed to determine a thermal model of the enclosed space. For example, the controller 132 and/or the scheduler 140 can process the collected timestamped temperature readings of the warming enclosed space 114 to determine the thermal model 500.

Figure 9:
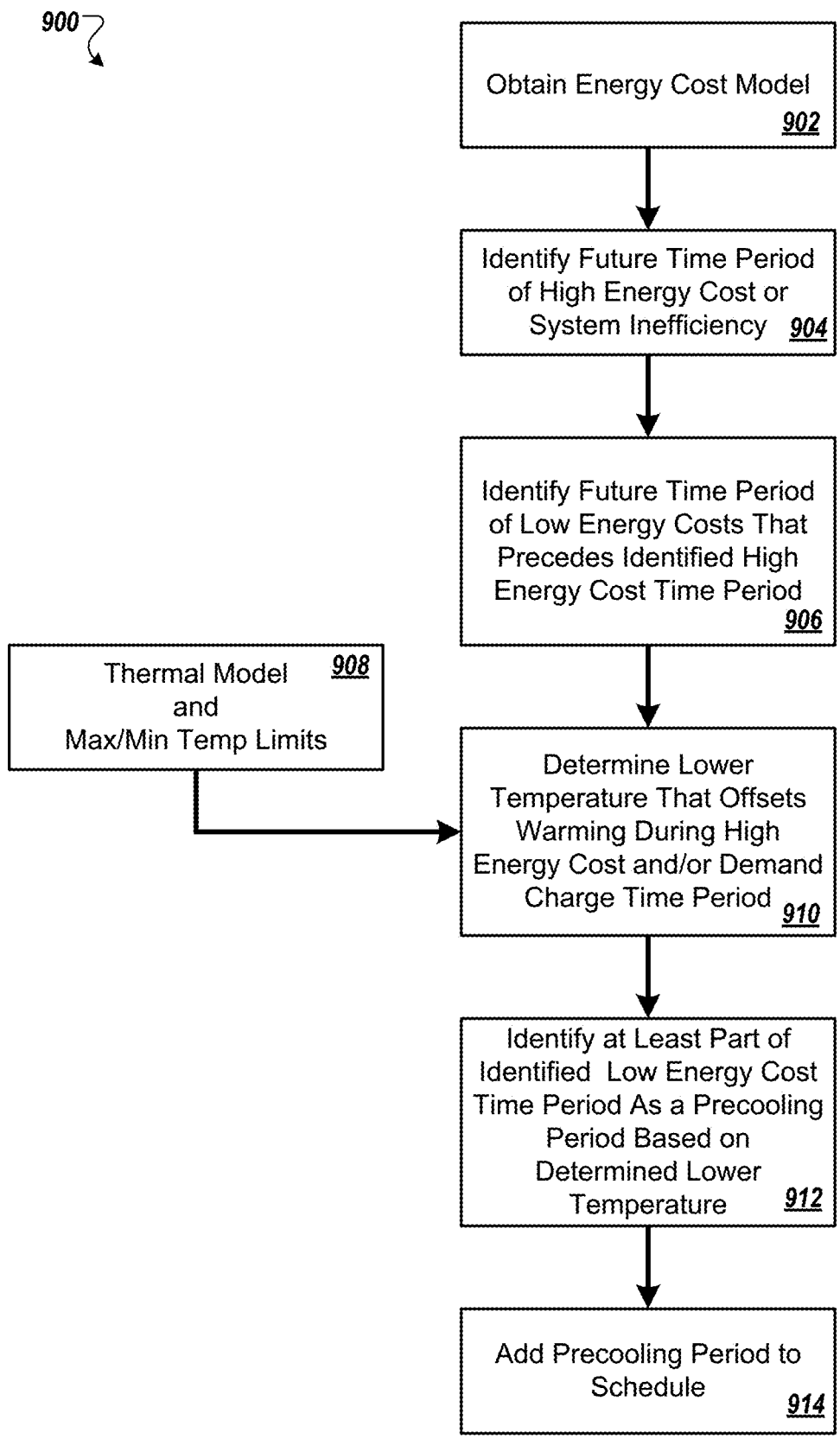
FIG. 9 is a flow diagram of an example process for refrigeration schedule management.

FIG. 9 is a flow diagram of an example process 900 for refrigeration schedule management. In some implementations, the process 900 can be the example step 730 of FIG. 7. In some implementations, the process 900 can be performed by parts or all of the example refrigeration management system 100 of FIG. 1 or the example refrigeration management system 600 of FIG. 6.

At 902, an energy cost model is obtained. For example, the scheduler 140 can query or otherwise request the energy cost model 162 (e.g., the example energy cost curve 454 of FIG. 4) from the utility provider 160.

At 904, a future period of time is identified. The period of time is identified based on times associated with relatively high energy costs. For example, the scheduler 140 can identify the peak 455 and designate a period of time that includes the peak 455 at the discharge period 462.

At 906, a second future period of time is identified. The second period of time is based on times associated with relatively low energy costs that precedes the identified high energy cost time period and/or demand charges. For example, the scheduler 140 can identify the period of time before the discharge period 462 as a charge period 460.

At 908, a thermal model, a maximum temperature limit value, and a minimum temperature limit value are obtained. For example, the controller 908 can obtain or determine the thermal model 500, and receive information about the highest and lowest temperatures that are allowed for the inventory 120. For example, some high-fat ice cream products can be best stored at −20° F. (e.g., establishing a maximum allowable temperature), but may be stored in plastic containers that become exceptionally brittle at −40° F. (e.g., establishing a minimum allowable temperature), and these temperatures can be used as the thermal boundaries used by the controller 132 for normal operations as well as precooling operations. In some implementations, the thermal model can be the output of the example process 800 of FIG. 8.

At 910, a lower temperature is determined that offsets warming during the high energy cost time period. For example, air temperature 418 is normally kept around −0.5° F., but the scheduler 140 can determine that the temperature of the enclosed space 114 could rise by about 3° F. during the discharge period 462, and drop the normal operating temperature of −0.5° F. by about −3° F. to about −3.5° F.

At 912, at least part of the identified low energy cost time period is identified as a precooling period based on the determined lower temperature. For example, the scheduler 140 can determine that the refrigeration system 130 will require six hours before the peak 455 to drop the temperature of the air in the enclosed space 114 from −0.5° F. to about −3.5° F.

At 914, the precooling period is added to an operational schedule. For example, the charge period 460 can be identified in the operational schedule 138 as a future time for precooling the enclosed space 114.

Figure 10:
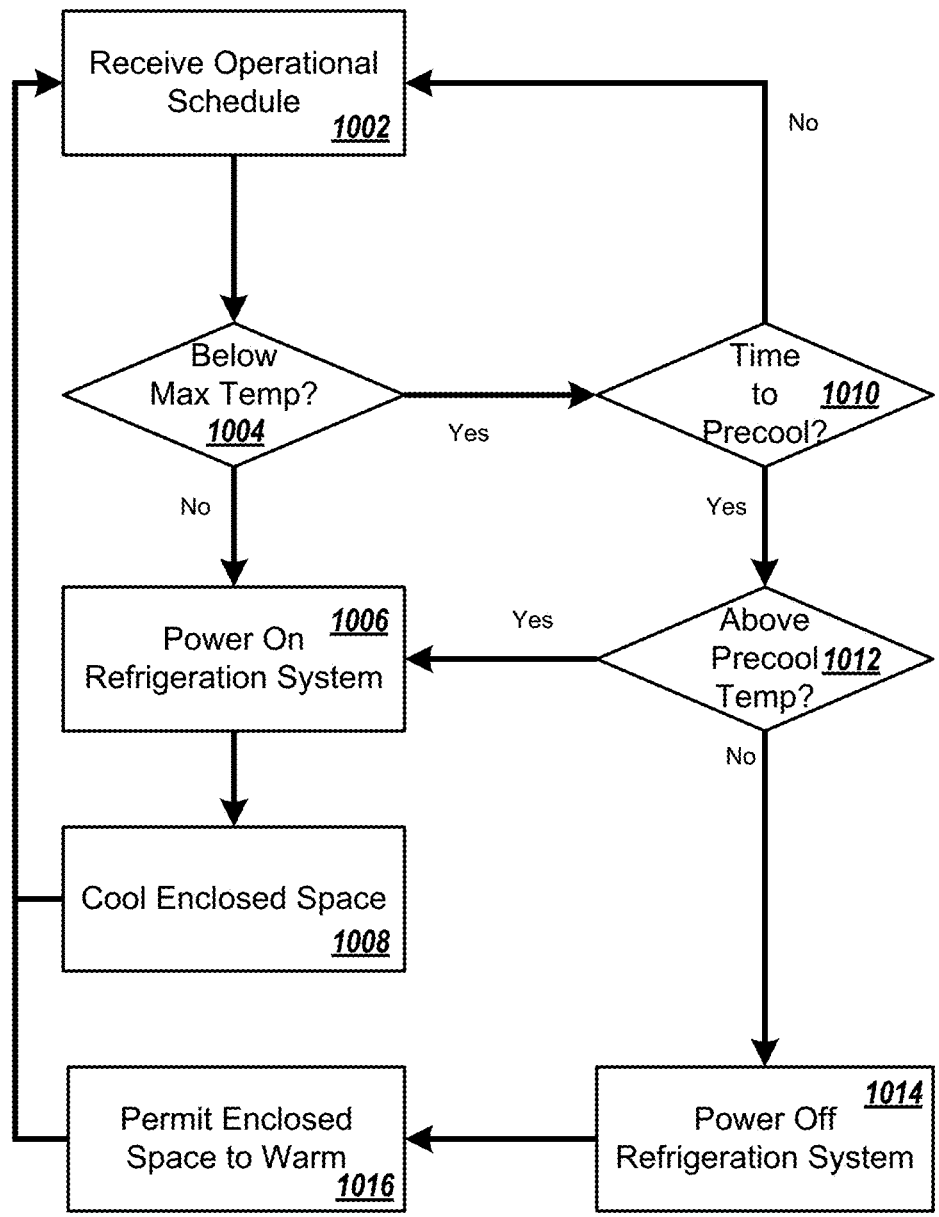
FIG. 10 is a flow diagram of an example process for refrigeration schedule implementation.

FIG. 10 is a flow diagram of an example process for refrigeration schedule implementation. In some implementations, the process 1000 can be the example step 740 of FIG. 7. In some implementations, the process 1000 can be performed by parts or all of the example refrigeration management system 100 of FIG. 1 or the example refrigeration management system 600 of FIG. 6.

At 1002, an operational schedule is received. For example, the controller 132 can receive the operational schedule 138 from the scheduler 140.

At 1004, a determination is made. If the temperature of an enclosed space is not below a predetermined maximum threshold temperature, then a refrigeration system is powered on at 1006 and the enclosed space is cooled at 1008. For example, of the enclosed space 114 reaches 0° F. when the thermostatic setpoint of the refrigeration system 130 is −1° F., then the refrigeration system 130 can turn on to cool the enclosed space 114. The process 1000 continues at 1002.

If at 1004 the temperature of an enclosed space is below the predetermined maximum threshold temperature, then another determination is made at 1010. If it is not time to precool the enclosed space, then the process continues at 1002. For example, if the chronometer 136 indicates that the current time is not a time that is identified by the operational schedule 138 as a precooling (e.g., charging) time, then the controller 132 can check for a new operational schedule and/or continue monitoring the time and temperature of the enclosed space 114.

If at 1010 it is time to precool, then another determination is made at 1012. If the temperature of the enclosed space is above a predetermined precooling temperature, then the refrigeration system is powered on at 1006. For example, if the chronometer 136 indicates that the current time is a time that is identified by the operational schedule 138 as a precooling (e.g., charging) time, then the controller 132 can set the temperature setpoint of the warehouse 120 to −4° F., and if the temperature of the enclosed space 114 is above the setpoint, the refrigeration system 130 can be turned on to cool the enclosed space 114.

If the temperature of the enclosed space is not above the predetermined precooling temperature, then the refrigeration system is powered off or put into a reduced power mode at 1014, and the enclosed space is allowed to warm at 1016. For example, the enclosed space 114 can be held at the predetermined lower precooling temperature of −4° F. until the precooling period ends.

Many of the previous examples have described in terms of reducing costs associated with operating refrigeration systems such as the example system 100 of FIG. 1, however the described pre-chilling techniques can be used for other purposes as well. In some embodiments, utility providers may use hydroelectric or wind power to provide much of the power to a grid, and then engage fossil fuel based generators (e.g., that are easily and quickly started up an shut down) to augment that power capacity during peak periods. As such, during periods of peak power usage, the environmental impact of power consumption can be relatively greater than at non-peak times of the day. The techniques described herein can enable refrigeration management systems to reduce their dependence on peak, possibly more polluting, power generation systems, and perform more of their operations using power from relatively "greener" power sources. In some embodiments, such environmental savings can be traded as a financial instrument (e.g., trading carbon credits). In some embodiments, the precooling techniques described herein can be used to sell back excess power to utility providers. For example, the facility 110 can have a contractual agreement with the utility provider 160 to consume 5 kWh of power per day, and that the utility provider 160 will compensate the facility 110 for every Watt of power the facility 110 does not consume of the agreed 5 kWh. From the perspective of the facility 110, the facility 110 can sell unused power back to the utility provider 160, possibly at a profit (e.g., by pre-chilling during some parts of the day to avoid power consumption during other parts of the day).

Figure 11:
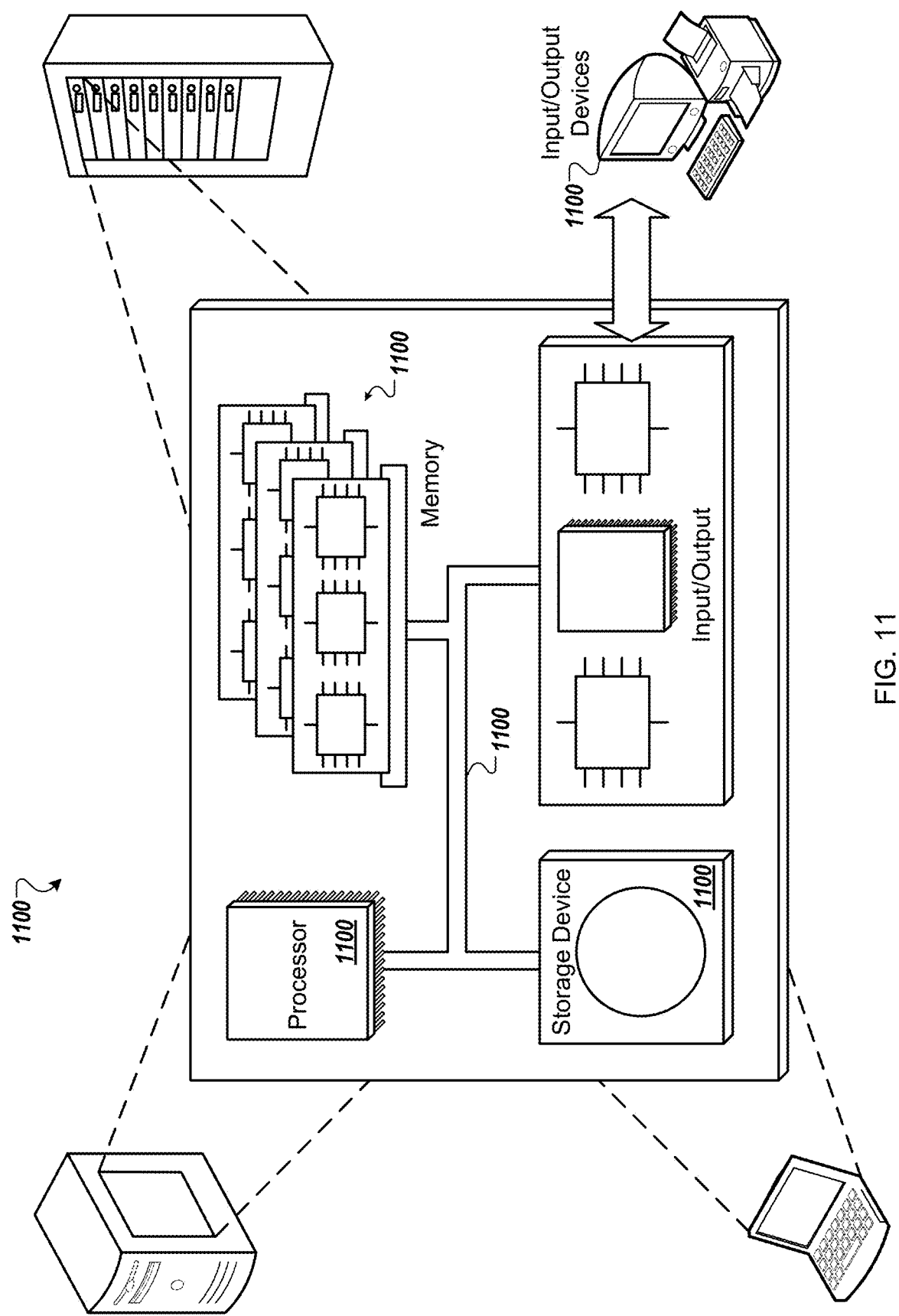
FIG. 11 is a schematic diagram of an example of a generic computer system.

FIG. 11 is a schematic diagram of an example of a generic computer system 1100. The system 1100 can be used for the operations described in association with the method 300 according to one implementation. For example, the system 1100 may be included in either or all of the controller 132, the refrigeration system 130, the scheduler 140, the utility provider 160, the other information provider 170, the edge node controller 614, and the context cluster 640.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A cold storage facility comprising:
    a cold storage enclosure defining an enclosed space;
    a refrigeration system configured to cool the enclosed space; and
    a control system comprising:
        a data processing apparatus;
        a communication subsystem that transmits and receives data over one or more networks and one or more media;
        a memory device storing instructions that when executed by data processing apparatus cause the control system to perform operations comprising:
            obtaining a logistics schedule for the enclosed space that identifies inventory expected to arrive at or be distributed from the cold storage facility over a predetermined period of time in the future;
            determining an amount of energy to be added to the enclosed space by the logistics schedule over the predetermined period of time in the future;
            determining an operational schedule for at least a portion of the refrigeration system based on the determined amount of energy for the logistics schedule, energy cost information, and a threshold temperature for the enclosed space, wherein the operational schedule identifies, at least, (i) a target temperature setpoint to which the enclosed space is to be cooled to maintain a temperature below the threshold temperature while the logistics schedule is performed and while the refrigeration system is deactivated, and (ii) a schedule identifying, at least, a first time at which the refrigeration system is activated to reach the target temperature setpoint, a second time at which the refrigeration system is deactivated, and a third time at which the refrigeration system is scheduled to be reactivated;
            activating, at the first time, the portion of the refrigeration system based on the operational schedule to cool the enclosed space to the target temperature setpoint;
            deactivating, at the second time, a powered portion of the refrigeration system based on the operational schedule to permit the enclosed space to be warmed toward the threshold temperature; and
            reactivating, at the third time, the portion of the refrigeration system to maintain the enclosed space below the threshold temperature.

2. The cold storage facility of claim 1, wherein the energy cost information includes weather forecasts for a geographic location associated with the cold storage facility.

3. The cold storage facility of claim 1, wherein the energy cost information includes a forecast of surplus solar energy.

4. The cold storage facility of claim 1, wherein the energy cost information includes a forecast of surplus wind energy.

5. The cold storage facility of claim 1, the operations further comprising adjusting the operational schedule based on thermal properties of the inventory expected to arrive at or be distributed from the cold storage facility over the predetermined period of time in the future.

6. The cold storage facility of claim 1, wherein the energy cost information includes a thermal model of the enclosed space based on temperature levels sensed by temperature sensors within the enclosed space.

7. The cold storage facility of claim 1, wherein the energy cost information includes an energy cost model that describes a schedule of variable energy costs over the predetermined period of time in the future.

8. The cold storage facility of claim 1, wherein the portion of the refrigeration system is reactivated, at the third time, after the logistics schedule has been performed while the portion of the refrigeration system was deactivated.

9. A cold storage management computer system for shifting times when a cold storage facility is cooled, the cold storage management computer system comprising:
    a data processing apparatus; and
    a memory device storing instructions that when executed by data processing apparatus cause the cold storage management computer system to perform operations comprising:
        obtaining a logistics schedule for an enclosed space that identifies inventory expected to arrive at or be distributed from the cold storage facility over a predetermined period of time in the future;
        determining an amount of energy to be added to the enclosed space by the logistics schedule over the predetermined period of time in the future;

determining an operational schedule for at least a portion of a refrigeration system based on the determined amount of energy for the logistics schedule, energy cost information, and a threshold temperature for the enclosed space, wherein the operational schedule identifies, at least, (i) a target temperature setpoint to which the enclosed space is to be cooled to maintain a temperature below the threshold temperature while the logistics schedule is performed and while the refrigeration system is deactivated, and (ii) a schedule identifying, at least, a first time at which the refrigeration system is activated to reach the target temperature setpoint, a second time at which the refrigeration system is deactivated, and a third time at which the refrigeration system is scheduled to be reactivated;

activating, at the first time, the portion of the refrigeration system based on the operational schedule to cool the enclosed space to the target temperature setpoint;

deactivating, at the second time, a powered portion of the refrigeration system based on the operational schedule to permit the enclosed space to be warmed toward the threshold temperature; and reactivating, at the third time, the portion of the refrigeration system to maintain the enclosed space below the threshold temperature.

10. The cold storage management computer system of claim 9, wherein the energy cost information includes weather forecasts for a geographic location associated with the cold storage facility.

11. The cold storage management computer system of claim 9, wherein the energy cost information includes a forecast of surplus solar energy.

12. The cold storage management computer system of claim 9, wherein the energy cost information includes a forecast of surplus wind energy.

13. The cold storage management computer system of claim 9, the operations further comprising adjusting the operational schedule based on thermal properties of the inventory expected to arrive at or be distributed from the cold storage facility over the predetermined period of time in the future.

14. The cold storage management computer system of claim 9, wherein the energy cost information includes a thermal model of the enclosed space based on temperature levels sensed by temperature sensors within the enclosed space.

15. The cold storage management computer system of claim 9, wherein the portion of the refrigeration system is reactivated, at the third time, after the logistics schedule has been performed while the portion of the refrigeration system was deactivated.

16. A method for shifting times when a cold storage facility is cooled, method comprising:

obtaining, by a computer system, a logistics schedule for an enclosed space that identifies inventory expected to arrive at or be distributed from the cold storage facility over a predetermined period of time in the future;

determining, by the computer system, an amount of energy to be added to the enclosed space by the logistics schedule over the predetermined period of time in the future;

determining, by the computer system, an operational schedule for at least a portion of a refrigeration system based on the determined amount of energy for the logistics schedule, energy cost information, and a threshold temperature for the enclosed space, wherein the operational schedule identifies, at least, (i) a target temperature setpoint to which the enclosed space is to be cooled to maintain a temperature below the threshold temperature while the logistics schedule is performed and while the refrigeration system is deactivated, and (ii) a schedule identifying, at least, a first time at which the refrigeration system is activated to reach the target temperature setpoint, a second time at which the refrigeration system is deactivated, and a third time at which the refrigeration system is scheduled to be reactivated;

activating, by the computer system at the first time, the portion of the refrigeration system based on the operational schedule to cool the enclosed space to the target temperature setpoint;

deactivating, by the computer system at the second time, a powered portion of the refrigeration system based on the operational schedule to permit the enclosed space to be warmed toward the threshold temperature; and reactivating, by the computer system at the third time, the portion of the refrigeration system to maintain the enclosed space below the threshold temperature.

17. The method of claim 16, further comprising adjusting, by the computer system, the operational schedule based on thermal properties of the inventory expected to arrive at or be distributed from the cold storage facility over the predetermined period of time in the future.

18. The method of claim 16, wherein the energy cost information includes a thermal model of the enclosed space based on temperature levels sensed by temperature sensors within the enclosed space.

19. The method of claim 16, wherein the energy cost information includes an energy cost model that describes a schedule of variable energy costs over the predetermined period of time in the future.

20. The method of claim 16, wherein the portion of the refrigeration system is reactivated, by the computer system at the third time, after the logistics schedule has been performed while the portion of the refrigeration system was deactivated.

21. The method of claim 16, wherein the energy cost information includes weather forecasts for a geographic location associated with the cold storage facility.

22. The method of claim 16, wherein the portion of the refrigeration system is reactivated, at the third time, after the logistics schedule has been performed while the portion of the refrigeration system was deactivated.

* * * * *